(12) United States Patent
Bobak et al.

(10) Patent No.: US 8,775,591 B2
(45) Date of Patent: Jul. 8, 2014

(54) REAL-TIME INFORMATION TECHNOLOGY ENVIRONMENTS

(75) Inventors: Mythili K. Bobak, Lagrangeville, NY (US); Chun-Shi Chang, Poughkeepsie, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 12/975,520

(22) Filed: Dec. 22, 2010

(65) Prior Publication Data

US 2011/0093853 A1 Apr. 21, 2011

Related U.S. Application Data

(62) Division of application No. 11/965,930, filed on Dec. 28, 2007, now abandoned.

(51) Int. Cl.
*G06F 15/173* (2006.01)
*G06Q 10/06* (2012.01)
*H04L 12/24* (2006.01)

(52) U.S. Cl.
CPC .............. *G06Q 10/06* (2013.01); *H04L 41/22* (2013.01); *H04L 41/0893* (2013.01); *H04L 41/085* (2013.01); *H04L 41/0654* (2013.01)
USPC .......................................... 709/223; 709/224

(58) Field of Classification Search
USPC ................................................ 709/223, 224
See application file for complete search history.

(56) References Cited

U.S. PATENT DOCUMENTS

| | | |
|---|---|---|
| 4,979,105 A | 12/1990 | Daly et al. |
| 5,023,873 A | 6/1991 | Stevenson et al. |
| 5,386,561 A | 1/1995 | Huynh et al. |
| 5,452,452 A | 9/1995 | Gaetner et al. |
| 5,481,694 A | 1/1996 | Chao et al. |
| 5,530,802 A | 6/1996 | Fuchs et al. |
| 5,537,542 A | 7/1996 | Eilert et al. |
| 5,604,863 A | 2/1997 | Allen et al. |
| 5,631,831 A | 5/1997 | Bird et al. |
| 5,652,908 A | 7/1997 | Douglas et al. |
| 5,790,780 A | 8/1998 | Brichta et al. |
| 5,797,005 A | 8/1998 | Bahls et al. |

(Continued)

FOREIGN PATENT DOCUMENTS

WO WO99/10814 A1 3/1999

OTHER PUBLICATIONS

Final Office Action for U.S. Appl. No. 11/965,855 dated Dec. 22, 2010.
Office Action for U.S. Appl. No. 11/965,832 dated Dec. 22, 2010.

(Continued)

*Primary Examiner* — Andrew Georgandellis
(74) *Attorney, Agent, or Firm* — Dennis Jung, Esq.; Blanche E. Schiller, Esq.; Heslin Rothenberg Farley & Mesiti P.C.

(57) ABSTRACT

Real-time data of business applications of an Information Technology environment is monitored to obtain information to be used in managing the environment. A business application includes processing collectively performed by a plurality of components of the environment. A component includes one or more resources, and therefore, in one example, the real-time data being monitored is associated with those resources.

20 Claims, 30 Drawing Sheets

(56) References Cited

U.S. PATENT DOCUMENTS

| | | |
|---|---|---|
| 5,826,080 A | 10/1998 | Dworzecki |
| 5,887,168 A | 3/1999 | Bahls et al. |
| 6,012,044 A | 1/2000 | Maggioncalda et al. |
| 6,012,152 A | 1/2000 | Douik et al. |
| 6,125,442 A | 9/2000 | Maves et al. |
| 6,336,138 B1 | 1/2002 | Caswell et al. |
| 6,385,613 B1 | 5/2002 | Grewell et al. |
| 6,393,386 B1* | 5/2002 | Zager et al. ............... 703/25 |
| 6,393,485 B1 | 5/2002 | Chao et al. |
| 6,408,277 B1 | 6/2002 | Nelken |
| 6,449,688 B1 | 9/2002 | Peters et al. |
| 6,480,944 B2 | 11/2002 | Bradshaw et al. |
| 6,625,751 B1 | 9/2003 | Starovic et al. |
| 6,732,118 B2 | 5/2004 | Hermann et al. |
| 6,785,768 B2 | 8/2004 | Peters et al. |
| 6,862,696 B1* | 3/2005 | Voas et al. ............... 714/38.11 |
| 6,934,247 B2 | 8/2005 | Bhattal et al. |
| 6,954,786 B1* | 10/2005 | Vered et al. ............... 709/223 |
| 6,983,321 B2 | 1/2006 | Trinon et al. |
| 6,983,362 B1* | 1/2006 | Kidder et al. ............... 713/1 |
| 7,032,186 B1 | 4/2006 | Gasser et al. |
| 7,039,827 B2 | 5/2006 | Meyer et al. |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,281,018 B1 | 10/2007 | Begun et al. |
| 7,313,573 B2 | 12/2007 | Leung et al. |
| 7,395,537 B1 | 7/2008 | Brown et al. |
| 7,409,356 B1 | 8/2008 | Geddes et al. |
| 7,437,611 B2 | 10/2008 | Agarwal et al. |
| 7,463,648 B1 | 12/2008 | Eppstein et al. |
| 7,490,265 B2 | 2/2009 | Baskey et al. |
| 7,499,954 B2 | 3/2009 | Cherkauer et al. |
| 7,509,529 B2 | 3/2009 | Colucci et al. |
| 7,523,359 B2 | 4/2009 | Richards et al. |
| 7,529,981 B2 | 5/2009 | Childress et al. |
| 7,568,019 B1 | 7/2009 | Bhargava et al. |
| 7,587,483 B1 | 9/2009 | Florissi et al. |
| 7,610,512 B2 | 10/2009 | Gerber |
| 7,620,953 B1 | 11/2009 | Tene et al. |
| 7,627,728 B1 | 12/2009 | Roeck et al. |
| 7,650,341 B1 | 1/2010 | Oratovsky et al. |
| 7,661,033 B2 | 2/2010 | Challener et al. |
| 7,707,173 B2 | 4/2010 | Nanavati et al. |
| 7,707,451 B2 | 4/2010 | Buskens et al. |
| 7,730,363 B2 | 6/2010 | Takezawa et al. |
| 7,743,001 B1 | 6/2010 | Vermeulen et al. |
| 7,747,730 B1 | 6/2010 | Harlow |
| 7,752,310 B2 | 7/2010 | Kageyama |
| 7,774,457 B1 | 8/2010 | Talwar et al. |
| 7,774,458 B2 | 8/2010 | Trinon et al. |
| 7,818,421 B2 | 10/2010 | Machida |
| 7,865,582 B2 | 1/2011 | Santos et al. |
| 7,917,814 B2 | 3/2011 | Hu et al. |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,065,554 B2 | 11/2011 | Herscovitz et al. |
| 8,086,758 B1 | 12/2011 | Allan et al. |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0194045 A1 | 12/2002 | Shay et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 | 5/2003 | Gahan et al. |
| 2003/0093672 A1 | 5/2003 | Cichowlas |
| 2003/0135384 A1 | 7/2003 | Nguyen |
| 2003/0135609 A1 | 7/2003 | Carlson et al. |
| 2003/0139956 A1 | 7/2003 | Guenther et al. |
| 2003/0200482 A1 | 10/2003 | Sullivan |
| 2003/0212580 A1 | 11/2003 | Shen |
| 2003/0212685 A1 | 11/2003 | Rakotoarivelo et al. |
| 2003/0236677 A1 | 12/2003 | Casati et al. |
| 2004/0034553 A1 | 2/2004 | Cole et al. |
| 2004/0054690 A1 | 3/2004 | Hillerbrand et al. |
| 2004/0111702 A1 | 6/2004 | Chan |
| 2004/0119752 A1 | 6/2004 | Beringer et al. |
| 2004/0143470 A1 | 7/2004 | Myrick et al. |
| 2004/0158777 A1 | 8/2004 | Bae et al. |
| 2004/0162741 A1 | 8/2004 | Flaxer et al. |
| 2004/0181476 A1 | 9/2004 | Smith et al. |
| 2004/0186905 A1 | 9/2004 | Young et al. |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 | 12/2004 | Koclanes et al. |
| 2005/0015641 A1 | 1/2005 | Alur et al. |
| 2005/0027835 A1 | 2/2005 | Raikar et al. |
| 2005/0033600 A1 | 2/2005 | Geddes et al. |
| 2005/0049906 A1 | 3/2005 | Leymann et al. |
| 2005/0060662 A1 | 3/2005 | Soares et al. |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 | 5/2005 | Aiber et al. |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0228707 A1 | 10/2005 | Hendrickson |
| 2005/0228852 A1 | 10/2005 | Santos et al. |
| 2005/0262242 A1 | 11/2005 | Byers et al. |
| 2006/0010234 A1 | 1/2006 | Reedy et al. |
| 2006/0020866 A1 | 1/2006 | Lo et al. |
| 2006/0037022 A1 | 2/2006 | Byrd et al. |
| 2006/0041505 A1 | 2/2006 | Enyart |
| 2006/0074993 A1 | 4/2006 | Pulamarasetti et al. |
| 2006/0111921 A1 | 5/2006 | Chang et al. |
| 2006/0112383 A1 | 5/2006 | Chang et al. |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0224702 A1 | 10/2006 | Schmidt et al. |
| 2006/0236061 A1 | 10/2006 | Koclanes |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 | 1/2007 | Morimotto et al. |
| 2007/0027734 A1 | 2/2007 | Hughes |
| 2007/0038490 A1 | 2/2007 | Joodi |
| 2007/0038492 A1 | 2/2007 | Ryan et al. |
| 2007/0061385 A1 | 3/2007 | Clark et al. |
| 2007/0067296 A1 | 3/2007 | Malloy et al. |
| 2007/0100712 A1 | 5/2007 | Kilpatrick et al. |
| 2007/0112847 A1 | 5/2007 | Dublish et al. |
| 2007/0150571 A1 | 6/2007 | Haga et al. |
| 2007/0165525 A1 | 7/2007 | Kageyama |
| 2007/0198678 A1 | 8/2007 | Dieberger et al. |
| 2007/0198789 A1 | 8/2007 | Clark et al. |
| 2007/0266029 A1 | 11/2007 | Baskey et al. |
| 2007/0271219 A1 | 11/2007 | Agarwal et al. |

(56) References Cited

U.S. PATENT DOCUMENTS

| | | |
|---|---|---|
| 2007/0286219 A1 | 12/2007 | Knop et al. |
| 2007/0294406 A1 | 12/2007 | Suer et al. |
| 2007/0300204 A1 | 12/2007 | Andreev et al. |
| 2008/0005739 A1 | 1/2008 | Sadiq et al. |
| 2008/0052719 A1 | 2/2008 | Briscoe et al. |
| 2008/0063423 A1 | 3/2008 | Matoba |
| 2008/0140495 A1 | 6/2008 | Bhamidipaty et al. |
| 2008/0147452 A1 | 6/2008 | Renz et al. |
| 2008/0215909 A1 | 9/2008 | Bretschneider et al. |
| 2008/0294777 A1 | 11/2008 | Karve et al. |
| 2008/0295100 A1 | 11/2008 | Ainsworth |
| 2008/0317217 A1 | 12/2008 | Bernardini et al. |
| 2009/0037363 A1 | 2/2009 | Kozlov et al. |
| 2009/0077210 A1 | 3/2009 | Musman et al. |
| 2009/0113383 A1 | 4/2009 | Delima et al. |
| 2009/0125751 A1 | 5/2009 | Dawson et al. |
| 2009/0150456 A1 | 6/2009 | Balasubramanian et al. |
| 2009/0150887 A1 | 6/2009 | Sanghvi et al. |
| 2009/0171703 A1 | 7/2009 | Bobak et al. |
| 2009/0171704 A1 | 7/2009 | Bobak et al. |
| 2009/0171705 A1 | 7/2009 | Bobak et al. |
| 2009/0171706 A1 | 7/2009 | Bobak et al. |
| 2009/0171707 A1 | 7/2009 | Bobak et al. |
| 2009/0171708 A1 | 7/2009 | Bobak et al. |
| 2009/0171730 A1 | 7/2009 | Bobak et al. |
| 2009/0171731 A1 | 7/2009 | Bobak et al. |
| 2009/0171732 A1 | 7/2009 | Bobak et al. |
| 2009/0171733 A1 | 7/2009 | Bobak et al. |
| 2009/0172149 A1 | 7/2009 | Bobak et al. |
| 2009/0172460 A1 | 7/2009 | Bobak et al. |
| 2009/0172461 A1 | 7/2009 | Bobak et al. |
| 2009/0172470 A1 | 7/2009 | Bobak et al. |
| 2009/0172668 A1 | 7/2009 | Bobak et al. |
| 2009/0172669 A1 | 7/2009 | Bobak et al. |
| 2009/0172670 A1 | 7/2009 | Bobak et al. |
| 2009/0172671 A1 | 7/2009 | Bobak et al. |
| 2009/0172674 A1 | 7/2009 | Bobak et al. |
| 2009/0172682 A1 | 7/2009 | Bobak et al. |
| 2009/0172687 A1 | 7/2009 | Bobak et al. |
| 2009/0172688 A1 | 7/2009 | Bobak et al. |
| 2009/0172689 A1 | 7/2009 | Bobak et al. |
| 2009/0172769 A1 | 7/2009 | Bobak et al. |
| 2009/0249337 A1 | 10/2009 | Vasilevsky et al. |
| 2010/0280863 A1 | 11/2010 | Wilcock et al. |
| 2011/0004564 A1 | 1/2011 | Rolia et al. |

OTHER PUBLICATIONS

Final Office Action for U.S. Appl. No. 11/965,872 dated Dec. 22, 2010.
Final Office Action for U.S. Appl. No. 11/965,922 dated Jul. 29, 2011.
Final Office Action for U.S. Appl. No. 11/965,845 dated Jul. 29, 2011.
Final Office Action for U.S. Appl. No. 11/965,913 dated Aug. 17, 2011.
Final Office Action for U.S. Appl. No. 11/965,838 dated Aug. 19, 2011.
Office Action for U.S. Appl. No. 11/965,832 dated Aug. 23, 2011.
Office Action for U.S. Appl. No. 11/965,902 dated Aug. 23, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Office Action for U.S. Appl. No. 11/965,894 dated Jul. 18, 2011.
Final Office Action for U.S. Appl. No. 11/965,926 dated Jul. 19, 2011.
"BPEL Project," http://www.eclipse.org/bpel/; Jul. 3, 2008.
"Factor Analysis Using SAS PROC FACTOR," http://www.utexas.edu/cc/docs/stat53.html, Jul. 7, 2008.
"Principal Components and Factor Analysis," http://statsoft.com/textbook/stfacan.html, Jul. 3, 2008.
"WebSphere Integration Developer", Jul. 3, 2008, http://www-306.ibm.com/software/integration/wid/about/?s_CMP=rnav.
Bolie et al., "BPEL Cookbook: Best Practices for SOA-based Integration and Composite Applications Development," 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals ($7^{th}$ Edition); Core Series; 2003; Sun Microsystem, Inc., ISBN 013147205; pp. 324-327.
Perry, J. Steven, "Java Management Extension: $1^{st}$ Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 067324083; pp. 54-64.
Evans, James, "Optimization Algorithms for Networks and Graphs, Second Edition," 1992, CCR, ISBN 0824786025, Chapters 1-3 (pp. 1-76) and Chapter 11 (pp. 390-413).
Joliffe, Ian T., "Principal Component Analysis," 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Hortsmann, Cay S. et al., Core Java 2—vol. II—Advanced Features ($7^{th}$ Edition), Sun Microsystems Press, 2005, ISBN 0131118269, Chapter 1 (pp. 1-22).
"Parasoft BPEL Maestro," http://www.parasoft, com/jsp/products/home.jsp?product=BPEL, Mar. 3, 2009.
Office Action for U.S. Appl. No. 11/966,495 dated Oct. 29, 2009.
Final Office Action for U.S. Appl. No. 11/966,495 dated May 14, 2010.
Final Office Action for U.S. Appl. No. 11/966,495 dated Jun. 14, 2010.
Office Action for U.S. Appl. No. 11/965,874 dated Mar. 18, 2010.
Final Office Action for U.S. Appl. No. 11/965,874 dated Oct. 14, 2010.
Office Action for U.S. Appl. No. 11/965,897 dated Mar. 31, 2010.
Final Office Action for U.S. Appl. No. 11/965,897 dated Sep. 17, 2010.
Office Action for U.S. Appl. No. 11/965,855 dated Apr. 30, 2010.
Office Action for U.S. Appl. No. 11/965,862 dated Jun. 23, 2010.
Office Action for U.S. Appl. No. 11/965,862 dated Dec. 7, 2010.
Office Action for U.S. Appl. No. 11/965,872 dated Jul. 6, 2010.
Office Action for U.S. Appl. No. 11/965,930 dated Apr. 1, 2010.

(56) References Cited

OTHER PUBLICATIONS

Final Office Action for U.S. Appl. No. 11/965,930 dated Sep. 29, 2010.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford, C. H. et al., "Toward an On Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.
Office Action for U.S. Appl. No. 11/965,902 dated Nov. 16, 2012.
Final Office Action for U.S. Appl. No. 11/965,838 dated Aug. 9, 2013, pp. 1-19.
Office Action for U.S. Appl. No. 11/965,845 dated Aug. 13, 2013, pp. 1-46.
Office Action for U.S. Appl. No. 11/9654,926 dated Aug. 14, 2013, pp. 1-29.
Office Action for U.S. Appl. No. 11/965,922 dated Aug. 14, 2013, pp. 1-35.
Office Action for U.S. Appl. No. 11/965,899 dated Aug. 28, 2013, pp. 1-20.
Notice of Allowance for U.S. Appl. No. 11/965,917 dated Aug. 28, 2013, pp. 1-25.
Notice of Allowance for U.S. Appl. No. 11/965,862 dated Sep. 16, 2013, pp. 1-15.
Hunter, Erwin L., "Recovery from Software Faults in the EWSD Digital Switching System," IEEE International Conference on Communications, May 1994, pp. 1784-1788.
Final Office Action for U.S. Appl. No. 11/965,889 dated Jan. 11, 2013, pp. 1-15.
Final Office Action for U.S. Appl. No. 11/965,899 dated Jan. 29, 2013, pp. 1-17.
Final Office Action for U.S. Appl. No. 11/965,862 dated Apr. 4, 2013, pp. 1-19.
Office Action for U.S. Appl. No. 11/965,838 dated Apr. 30, 2013, pp. 1-30.
Office Action for U.S. Appl. No. 11/965,894 dated May 8, 2013, pp. 1-9.
Notice of Allowance for U.S. Appl. No. 11/965,894 dated Nov. 7, 2013, pp. 1-16.
Final Office Action for U.S. Appl. No. 11/965,922 dated Dec. 27, 2013, pp. 1-65.
Charfi, Anis and Mira Mezini, "Aspect-Oriented Workflow Languages," Oct. 2006, pp. 183-200.
Charfi, Anis and Mira Mezini, "Aspect-Oriented Web Service Composition with A04BPEL," 2004 (no further date information available), pp. 168-182.
Lassen, Kristian Bisgaard and Wil M.P. van der Aalst, "WorkflowNet2BPEL4WS: A Tool for Translating Unstructured Workflow Processes to Readable BPEL," Oct. 2006, pp. 127-144.
Karastoyanova, Dimka et al., "Extending BPEL for Run Time Adaptability," Sep. 2005, pp. 15-26.
Mayer, Philip and Daniel Lubke, "Towards a BPEL Unit Testing Framework," Jul. 2006, pp. 33-42.
Notice of Allowance for U.S. Appl. No. 11/965,926 dated Dec. 31, 2013, pp. 1-28.
Notice of Allowance for U.S. Appl. No. 11/965,845 dated Dec. 31, 2013, pp. 1-28.

\* cited by examiner

FIG. 6A

| MESSAGE | RESOURCE | DATE |
|---|---|---|
| ! CONTAINMENT REGION HAS RECOVERED | CONTAINMENT | APR 18, 2006 10:50:52.193 |
| X CONTAINMENT REGION CREATED FOR RESOURCE FAILURE | CONTAINMENT | APR 18, 2006 10:50:52.103 |
| ! CONTAINMENT REGION HAS RECOVERED | CONTAINMENT3 | APR 18, 2006 10:50:51.982 |
| X DETECTED DYNAMIC MEMBERSHIP CHANGE: ACTIVE POLICY RED... | RECOVERYSEGMENT2 | APR 18, 2006 10:12:25.696 |
| X THIS RESOURCE HAS ENTERED AN UNRECOVERABLE STATE AND RED... | RECOVERY MANAGER2 | APR 18, 2006 10:12:25.696 |
| X THIS RESOURCE HAS ENTERED AN UNRECOVERABLE STATE AND RED... | RECOVERY MANAGER1 | APR 18, 2006 10:12:14.770 |
| X ACTIVATION OF POLICY XYZ HAS FAILED | RECOVERY SEGMENT1 | APR 18, 2006 10:12:14.760 |
| ! DETECTED DYNAMIC MEMBERSHIP CHANGE ACTIVE POLICY RED... | RECOVERY SEGMENT2 | APR 18, 2006 10:10:25.655 |

FIG. 6B

THE RESOURCE "CODER 1 RECOVERY" HAS ENTERED AN UNRECOVERABLE STATE THAT REQUIRES YOUR INPUT. DO YOU WANT TO OPEN THE RESOURCE NOW?

[YES] [NO]

REAL-TIME INFORMATION TECHNOLOGY ENVIRONMENTS

This application is a divisional application of co-pending U.S. patent application Ser. No. 11/965,930, filed Dec. 28, 2007, entitled "Real-Time Information Technology Environments," Bobak et al., which is hereby incorporated herein by reference in its entirety.

BACKGROUND

This invention relates, in general, to managing customer environments to provide support for business resiliency, and in particular, to monitoring aspects of the environment to facilitate management thereof.

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

BRIEF SUMMARY

Based on the foregoing, a need exists for a capability that facilitates management of an IT environment. In particular, a need exists for a capability that enables real-time monitoring of business applications of the environment and use of the information obtained from monitoring to manage one or more aspects of the environment.

The shortcomings of the prior art are overcome and additional advantages are provided through the provision of a computer-implemented method to facilitate management of an Information Technology (IT) environment. The method includes, for instance, performing, by a processor coupled to a memory, monitoring associated with a chosen business application of the IT environment, the performing monitoring including monitoring selected real-time data located in a cache and associated with one or more resources of the business application; updating at least a portion of the cache based on the monitoring; determining, based on an action to be taken, whether real-time data in the cache associated with the action is sufficient, in terms of being current, to be used for the action; using real-time data in the cache for the action, responsive to the determining indicating sufficiency for the action to be taken; and updating at least a portion of the real-time data in the cache to obtain more recent data for the action, responsive to the determining indicating insufficiency.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION

Figure 1:
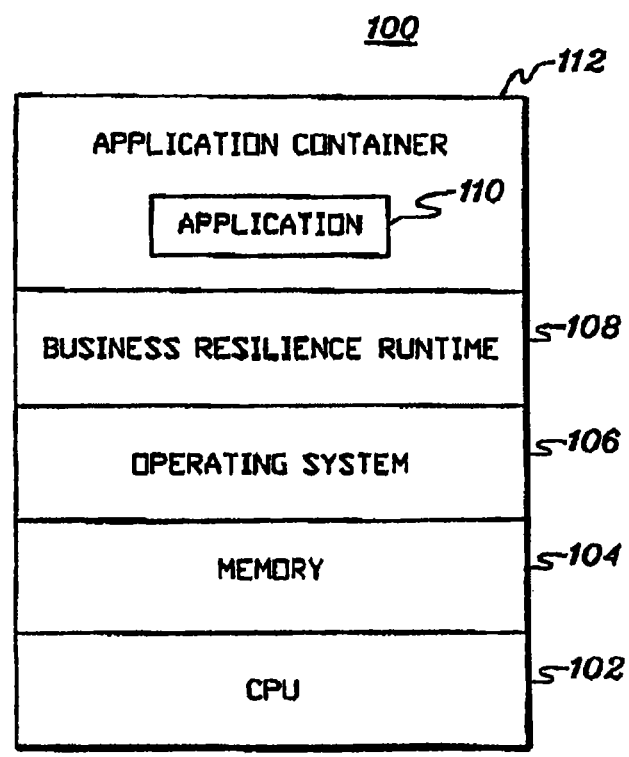
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.

19. Customer ability to modify pre-conditioning workflows, consistent with supported operations on resources.

20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.

21. Ability to divide pre-conditioning work between long running and immediate, nondisruptive short term actions.

22. Impact only the smallest set of resources required during recovery, to avoid negative residual or side effects for attempting to recover a broader set of resources than what is actually impacted by the failure.

23. Choosing recovery operations based on determination of which recovery actions address the minimal impact, to meet goal, and then prepare for subsequent escalation in event of failure of initial recovery actions.

24. Choosing a target for applications and operating systems (OS), based on customer co-location specifications, redundancy groups, and realtime system state.

25. Ability for customer to indicate specific effect that recovery of a given business process can have on another business process—to avoid situations where lower priority workloads are recovered causing disruption to higher priority workloads; handling situations where resources are shared.

26. Ability to prioritize ongoing recovery processing over configuration changes to an availability system, and over any other administration functions required for the availability system.

27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).

28. Allow for possible non-responsive resources or underlying infrastructure that does not have known maximum delays in response time in determining recovery actions, while not going beyond the allotted recovery time.

29. Allow customer to change quantified business recovery goals/targets without disruption to the existing recovery capability, with appropriate labeling of version of the policy to facilitate interaction with change management systems.

30. Allow customers to change logical groupings of resources that have assigned recovery goals, without disruption to the existing recovery capability, with changes versioned to facilitate interaction with change management systems.

31. Ability to specify customizable human tasks, with time specifications that can be incorporated into the goal achievement validation so customers can understand the full time involved for a recovery and where focusing on IT and people time is critical to reducing RTO.

32. There is a requirement/desire to implement dynamically modified redundancy groupings for those resources which are high volume—automatic inclusion based on a specified set of characteristics and a matching criteria.

33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.

2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.

3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System Z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
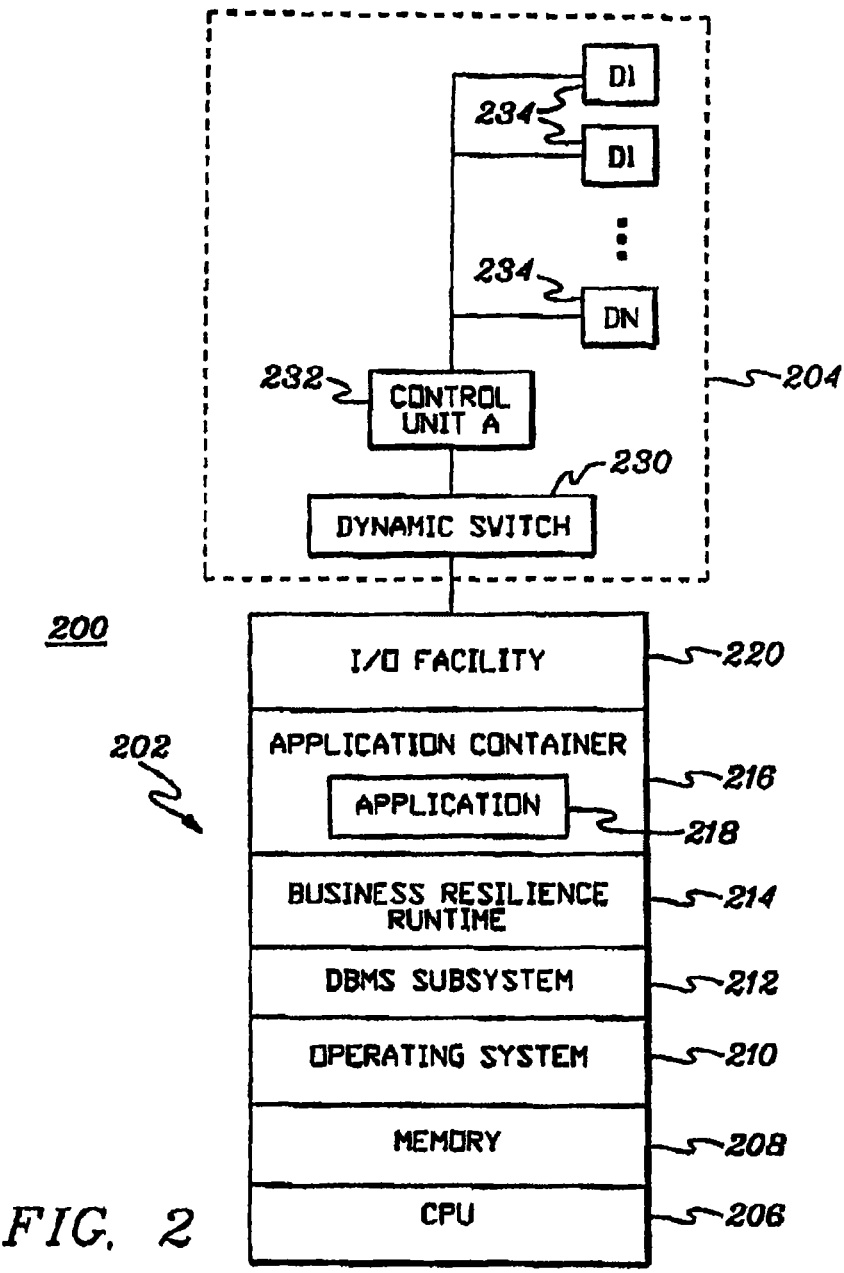
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
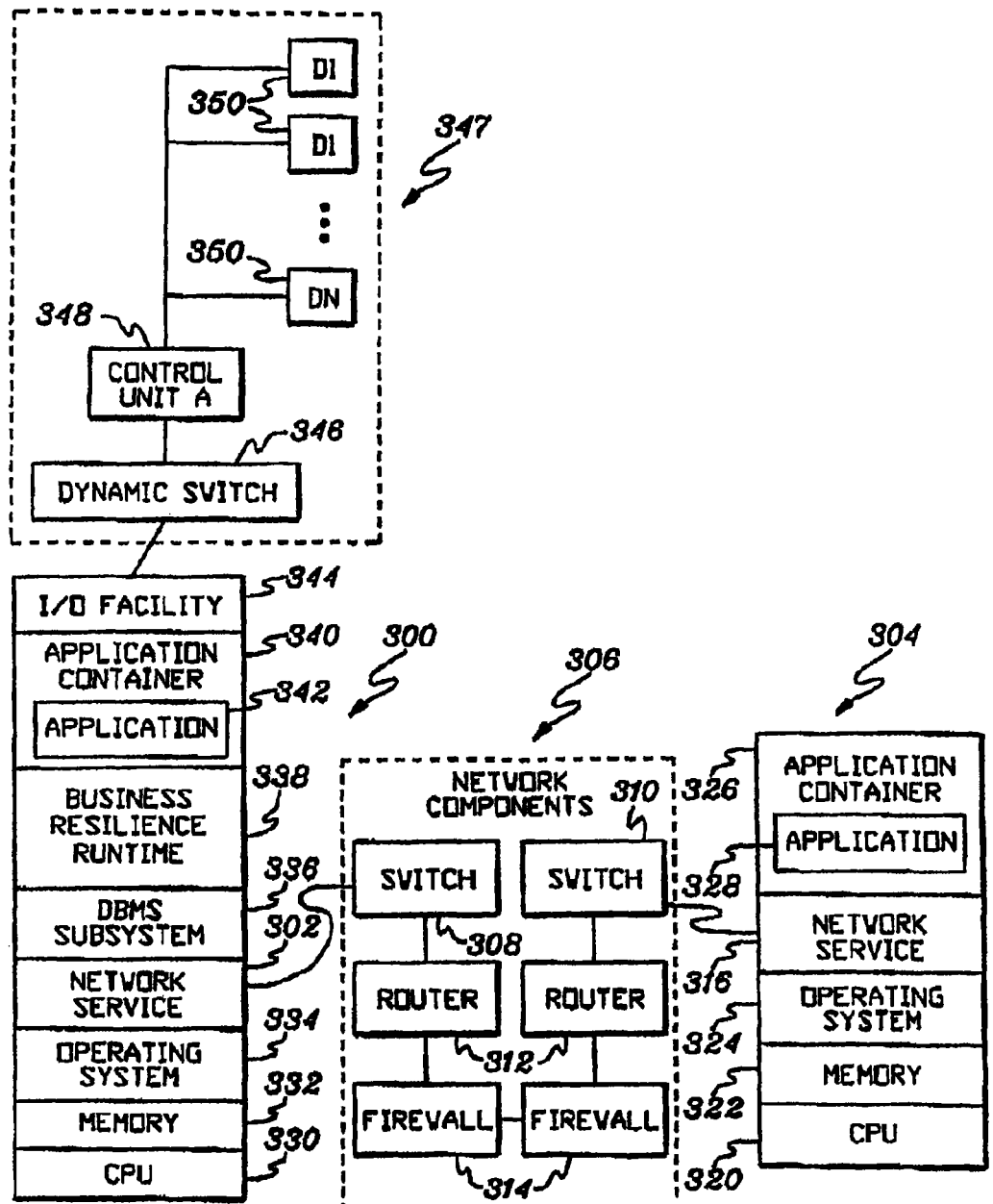
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
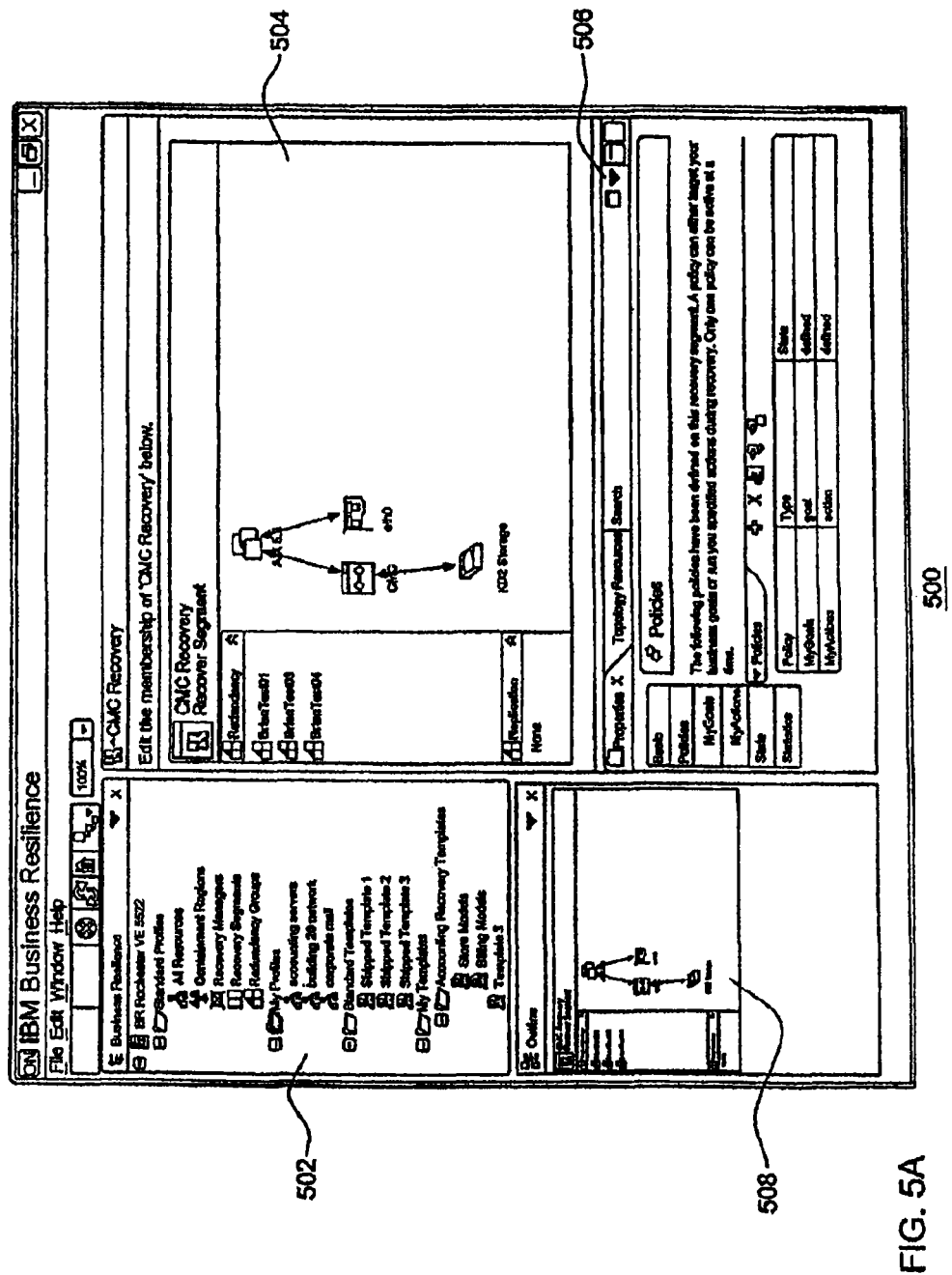
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
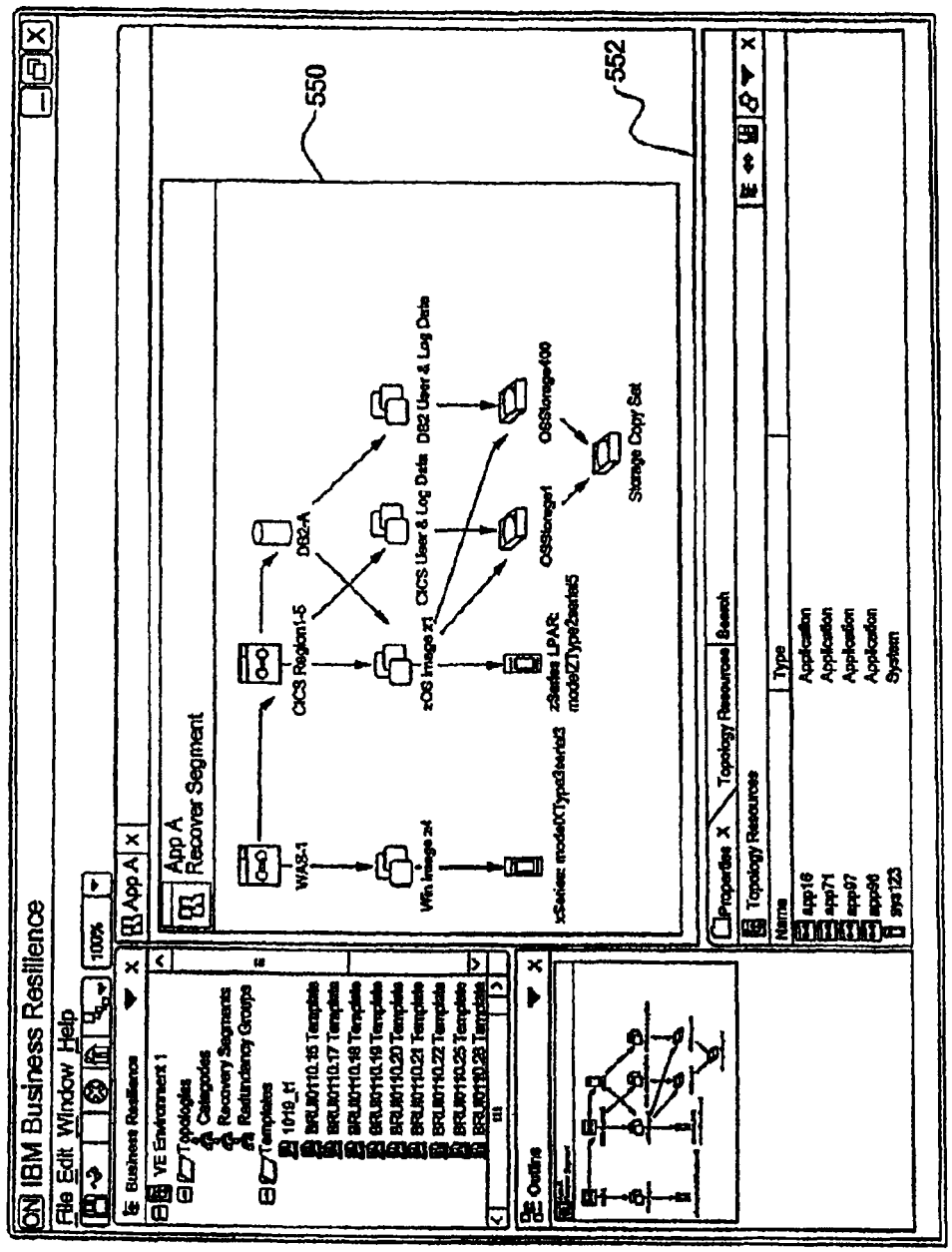
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
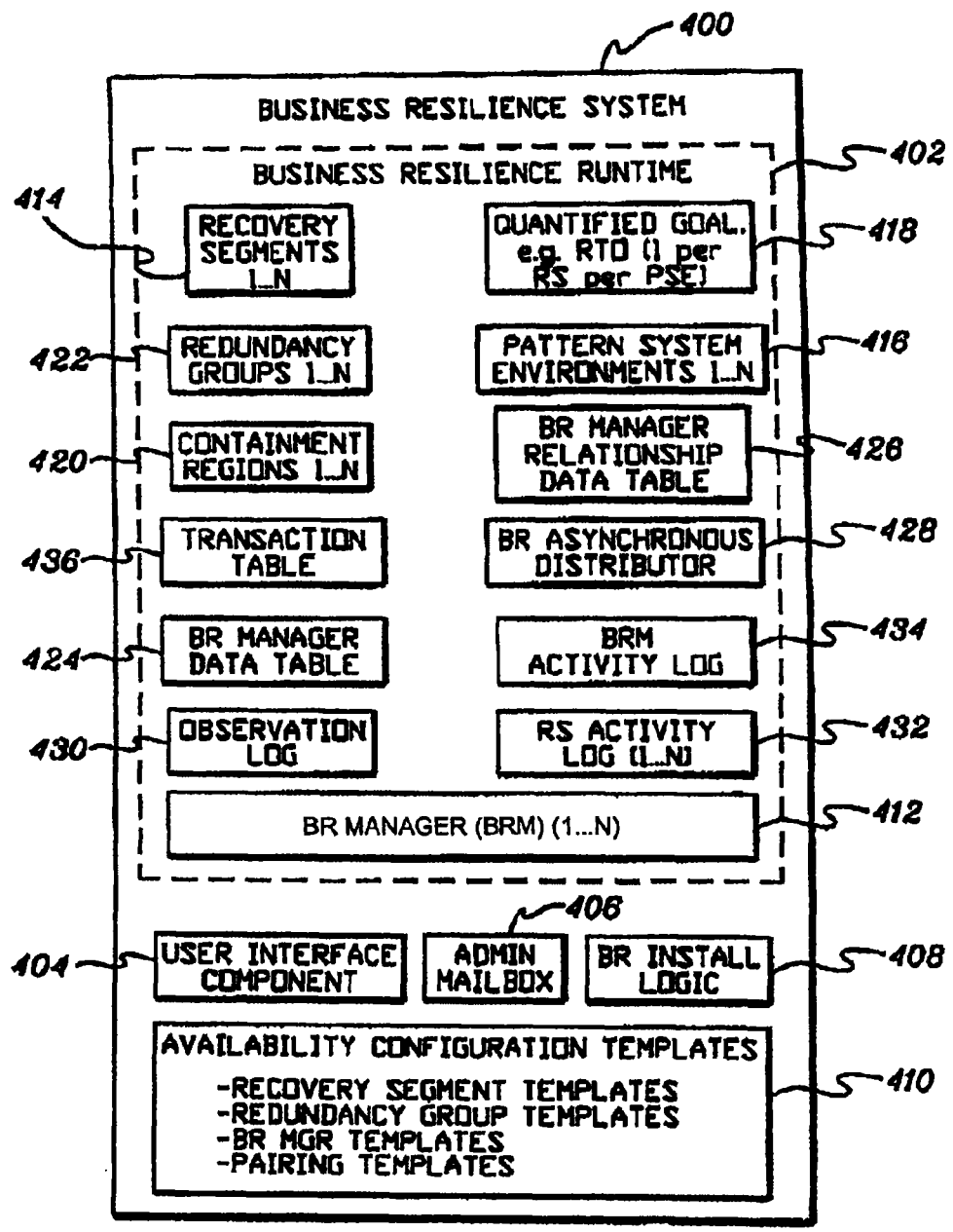
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
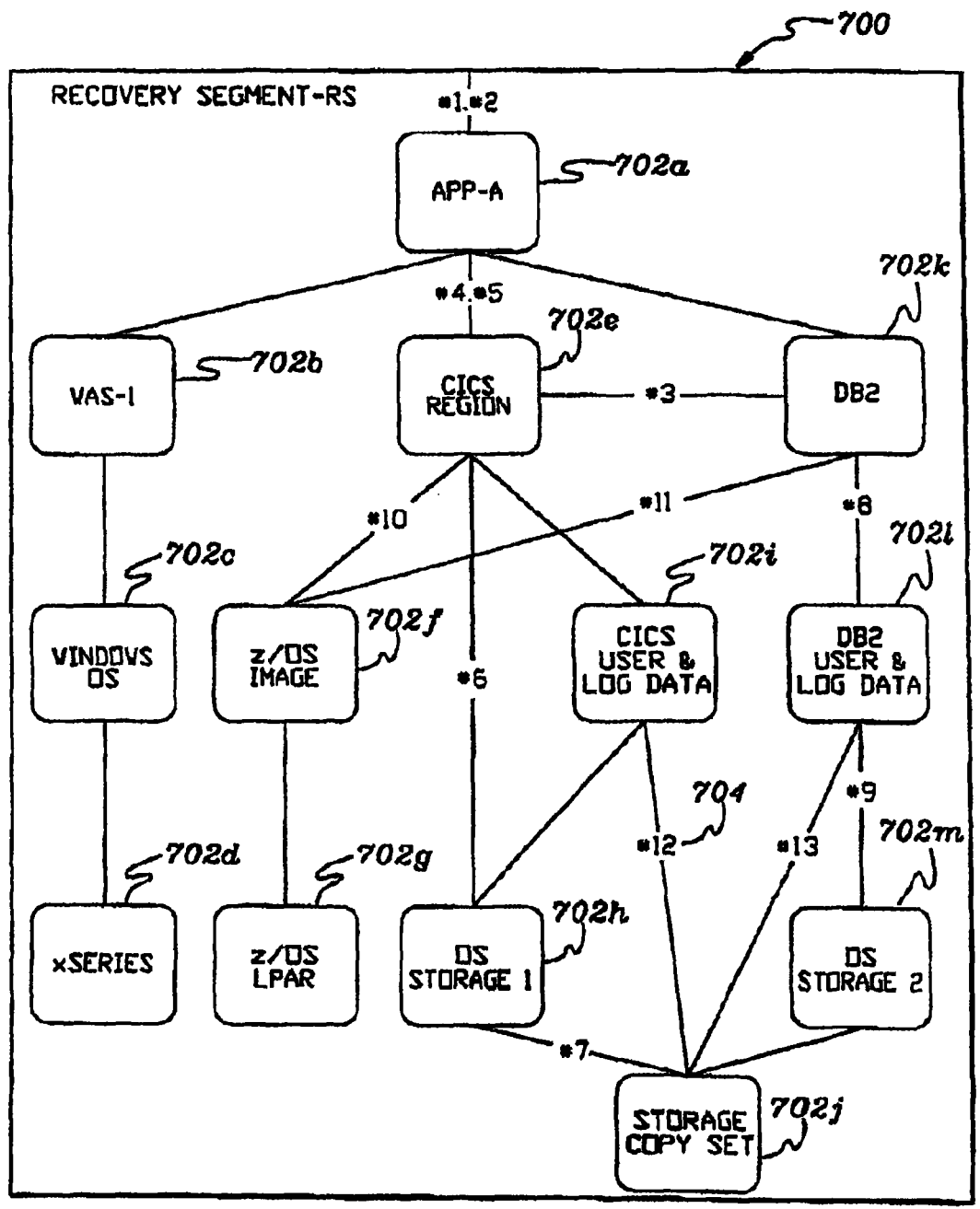
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|------|-------------|-------------|-------------|-------------|
| 1 | App-A | Degraded | RS | Degraded |
| 2 | App-A | Unavailable | RS | Unavailable |

-continued

| Rule | Resource #1 | State | Resource #2 | State |
|---|---|---|---|---|
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702*h* fails (goes Unavailable).
RS gets notified of state change event.
1st level state aggregation determines:
    Storage Copy Set→Degraded
    CICS User & Log Data→Degraded
    DB2→User & Log Data→Degraded
    DB2→Degraded
    CICS→Unavailable
    App-A→Unavailable
1st level state aggregation determines:
    RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
RS definition from representation of IT Resources;
Goal (RTO) and action policy specification, validation and activation; and
Tooling by Eclipse, as an example, to integrate with IT process management.

Rapid, flexible, administrative level:
Alteration of operation escalation rules;
Customization of workflows for preparatory and recovery to customer goals;
Customization of IT resource selection from RG based on quality of service (QoS);
Alteration of definition of IT resource and business application state (available, degraded, or unavailable);
Customization of aggregated state;
Modification of topology for RS and RG definition;
Selection of BR deployment configuration;
Alteration of IT resource recovery metrics;
Customization of generated Pattern System Environments; and
Specification of statistical tolerances required for system environment formation or recovery metric usage.

Extensible framework for customer and vendor resources:
IT resource definitions not specific to BR System; and
Industry standard specification of workflows, using, for instance, BPEL standards.

Adaptive to configuration changes and optimization:
IT resource lifecycle and relationships dynamically maintained;
System event infrastructure utilized for linkage of IT resource and BR management;
IT resource recovery metrics identified and collected;
IT resource recovery metrics used in forming Pattern System Environments;
Learned recovery process effectiveness applied to successive recovery events;
System provided measurement of eventing infrastructure timing;
Dynamic formation of time intervals for aggregation of related availability events to a root cause; and
Distribution of achieved recovery time over constituent resources.

Incremental adoption and coexistence with other availability offerings:
Potential conflict of multiple managers for a resource based on IT representation;
Workflows for recovery and preparatory reflect operations with meta data linked to existing operations;
Advisory mode execution for preparatory and recovery workflows; and
Incremental inclusion of resources of multiple types.

Support for resource sharing:
Overlapping and contained RS;
Merger of CR across RS and escalation of failure scope; and
Preparatory and recovery workflows built to stringency requirements over multiple RS.

Extensible formalization of best practices based on industry standards:
Templates and patterns for RS and RG definition;
Preparatory and recovery workflows (e.g., BPEL) for customization, adoption; and Industry standard workflow specifications enabling integration across customer and multiple vendors.

Integration of business resilience with normal runtime operations and IT process automation:

Option to base on IT system wide, open industry standard representation of resources;

BR infrastructure used for localized recovery within a system, cluster and across sites; and Utilization of common system infrastructure for events, resource discovery, workflow processing, visualization.

Management of the IT environment is adaptively performed, as described herein and in a U.S. Patent Application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. Patent Applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described herein, in accordance with one or more aspects of the present invention. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

- Coordination for administrative task that employ multiple steps, as described in "Adaptive Computer Sequencing of Actions," (POU920070106US1), Bobak et al., which is hereby incorporated herein by reference in its entirety.
- Use of provided templates representing best practices in defining the BR system, as described in "Defining and Using Templates in Configuring Information Technology Environments," (POU920070109US1), Bobak et al., which is hereby incorporated herein by reference in its entirety.
- Use of provided templates in formulation of workflows, as described in "Using Templates in a Computing Environment," (POU920070126US1), Bobak et al., which is hereby incorporated herein by reference in its entirety.
- Making changes to the availability goals while supporting ongoing BR operation, as described in "Non-Disruptively Changing a Computing Environment," (POU920070122US1), Bobak et al., which is hereby incorporated herein by reference in its entirety.
- Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.
- Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
|---|---|---|
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |

-continued

| Resource Type | Property | Value Range |
|---|---|---|
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |

| Resource Type | Property | Value Range |
| --- | --- | --- |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |

| Resource Type | Property | Value Range |
| --- | --- | --- |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
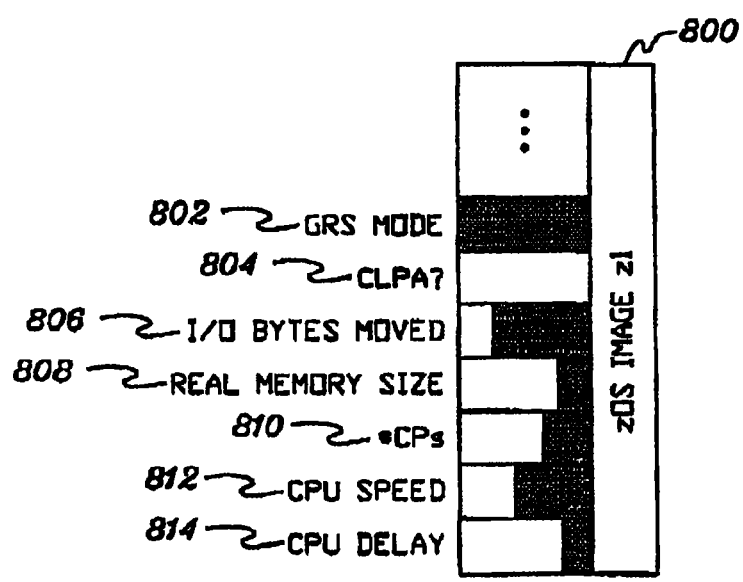
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
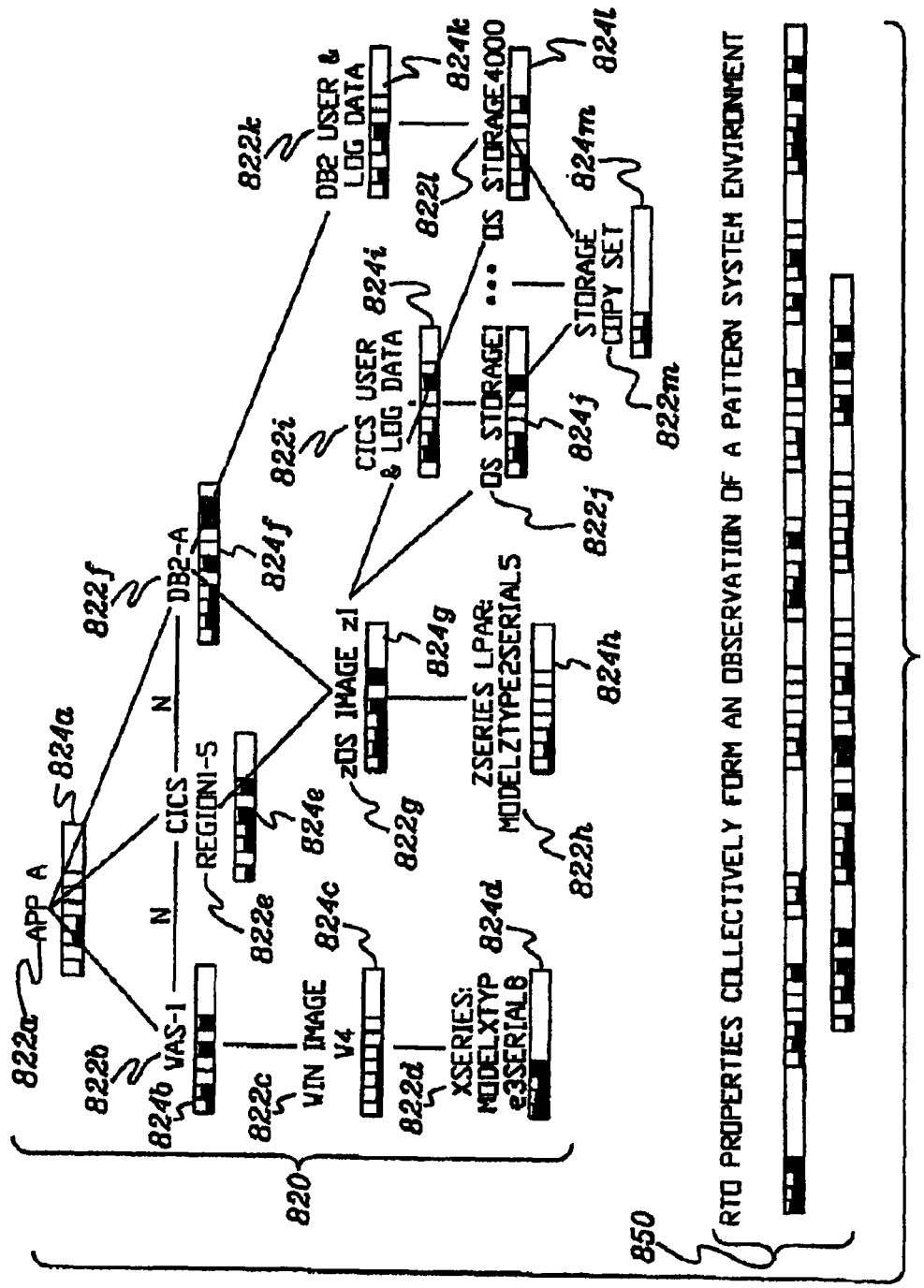
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

| | |
| --- | --- |
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

| Metric | Qualification |
| --- | --- |
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.

Are present to understand impacts on managed resources.

No decomposed RTO is associated with an assessed resource.

They are resources on which resources managed by BR depend upon, but are not directly acted on for availability by BR.

They are resources removed (or not explicitly added) from the actively monitored set of resources by the BR admin during RS definition.

They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.

The RS subscribes to state change notifications for assessed resources (and possibly other notifiable properties).

Relationships between observed and managed resources are possible (and likely).

BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.
2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, management of the BR environment is facilitated by real-time monitoring of the environment. Real-time data associated with business applications of the environment are monitored to provide information regarding the applications. That information is then used to manage the environment.

Presently, monitoring of a computer system environment is performed by existing products in a wide variety of ways. For example, there are automation products which are triggered off issuance of messages or events (e.g., ENF events within z/OS®). Additionally, there are periodic processes for gathering information on the status of a resource, such as the system or subsystem monitoring performed by XCF of z/OS® for Parallel Sysplex®. (Parallel Sysplex® is a registered trademark of International Business Machines Corporation.) However, in each case there fails to be an association of the status of resources to the customer business application in the context of the supporting overall IT environment, and there fails to be an open, extensible way for resources to surface through event changes in their state or critical properties.

Thus, one or more aspects of the present invention addresses the need for maintaining relatively current information on, for instance, resources and operation execution times, and on the use of that data when resources report changes to the environment. In the context of managing the IT environment for business application availability, a balance is struck between management of cached resource information and management of environment change notification.

Business Resilience (BR) uses information about resources and relationships actively during the processing of events, including recovery related events. BR also has fairly tight restrictions on the amount of time that can be spent in its own processing in order to produce a meaningful recovery process. Excessive time may be measured in seconds, as the chances for achieving a goal (e.g., RTO) and the chances for preserving a consistent state of the environment are reduced as internal processing time increases. As a result of this stringent requirement, BR implements a cache of resource and relationship data that also includes the properties about a resource that the BR design depends on during recovery processing. The implementation of this cache is in a set of database tables. BR relies on, for instance, the buffer pool capabilities of DB2® to maintain the information for read purposes without access to external storage for the data tables. In this manner, the BR implementation does not have to create a cache in storage.

Cached information is utilized in conjunction with explicit notification of change events on resource state, resource properties and topology. BR subscribes to topics supported by the underlying system services. Notification of events associated with those topics is provided by resources on state and property change. Additionally, notification events are provided on addition or deletion of resources or relationships to the collection of resources BR has established as a Recovery Segment representing a customer business application.

Overview

Monitoring of the IT environment by the BR system takes place in support of achieving the quantitative goals, such as a RTO. Two types of monitoring are utilized: explicit periodic requesting of resource data and subscription to resource services, which provide event notification of changes to resource data. Two mechanisms are utilized in order to insure changes in resource data are detected. The event mechanism may have unbounded delays or errors which preclude delivery of notification regarding resource data change. Making periodic requests for resource data further provides the needed mechanism for real-time analysis of expected delays in request/response processing for resource data and in event delivery.

In one implementation, monitoring may be initiated at one of two points in time. The BR system supports a form of resource data gathering termed observation mode during which resource data is gathered, but BR management to an availability goal is not performed. Observation mode uses the explicit periodic requesting of resource data, termed periodic poll. Processing responses to explicit requests for resource data (see Response to Periodic Poll Observation below) includes updating a cache of resource data, evaluating resources, RS(s) and RG(s) for state change and logging returned resource data. Enabling observation mode (see Activate Observation mode for RS below) may be performed before the point in time when active management to an availability goal is requested of the BR system. When active management to an availability goal is requested of the BR system (see RS Monitoring of Resource(s)-Activate Time below), if observation mode has not previously been activated, observation mode is entered causing periodic requests for resource data to begin. In addition to periodic requests for resource data, when the BR system begins active management of a goal, such as an availability goal, the BR system subscribes to event notification services supported by resources associated with the RS. Through subscriptions to events associated with resource data, the BR system should be provided direct notification by the resource representation of changes to resource data (see RS Monitoring Notification below).

Subscriptions for notification to the BR system of changes in resource data is discontinued when the RS is no longer managed to a goal (see Deactivate RS for Monitoring below). Observation mode may be discontinued if the RS is not being managed to a goal (see Deactivate Observation Mode for RS below).

When resources or relationships are deleted from the IT environment and are part of a RS, resource data becomes no longer requested by the periodic poll process and subscriptions are removed from event services providing notification of alterations in resource data. When resources are added to the IT environment, the BR administrator is advised of the change as it may be desirable to add resources to an RS (see Topology Lifecycle Change Notification below).

The monitoring process maintains a cache of resource data to be used by other aspects of the BR system (see Response to Periodic Poll Observation below). The cache includes, for example, data on resource state, resource property values, resource operation execution duration times and data regarding processor time, processor memory usage and I/O requests made by the resource. The set of resource data which is gathered by periodic poll and for which event subscriptions are initiated (see RS Monitoring Prep below) is created either when observation mode is initiated or when the RS becomes actively monitored for availability goal achievement. Resource state is always monitored, in one example, as are operation execution duration times for each operation potentially utilized by the BR system. Resource property values are monitored if they contributed to the composed state of a resource or the aggregated state of a RS or RG. Resource property values are also monitored if they are utilized in evaluating pairing trigger conditions.

As changes to resource data are received, either through the periodic poll process or through event notification reflecting change in resource data, an evaluation is made regarding any alterations to resource state, RS state or RG state. If changes to resource data result in a resource or RS becoming failed or degraded, as assessed based on the composite state of the resource or aggregated state of the RS or RG, error detection processing is initiated to begin the flow for determining what recovery actions should be taken.

The interval on which periodic poll requests for resource data are initiated may be altered by the customer (see Change Periodic Poke Interval below).

In accordance with one or more aspects of the present invention, the following functionality is provided, as examples:

1) Periodic Update of Cached Information on Resources Associated with Serving a Business Application:

Since a cache is by nature a copy of the information, the coherence is to be maintained at a level that is reasonable to the use of the data. In some cases, a cached copy of the data is sufficient, and in other cases, it is not the preferred method. In all cases, the cache is maintained by BR monitoring and BR administrative flows. The periodic observations that BR uses also gathers information on the required cache updates in an asynchronous, phased manner, in one example.

An example of when a cache can be used is for values of properties that are used in the BR state aggregation for RS, or in specification of triggers in determining operational dependency ordering. These will be as old as potentially the last (undelivered) notification, since there is unbounded delay on the messaging infrastructure supported by the underlying system services.

A case of where cached data is not preferred is in the assessment of state for resources when a recovery action is about to be formulated. In this case, BR makes an attempt to distribute asynchronous queries to gather state that is more recent than the last processed event. In the latter case, using only cached data is insufficient, and an unbounded delay on the messaging infrastructure can result in unpredictable coherency of the information used to recommend a recovery action. For example, if a resource transitioned to an available state, and the message was not delivered in the timeframe that BR has to suggest a recovery process, then a process restarting the resource may be recommended, even though the resource became available. However, if there is no response to an asynchronous query for a given resource, BR resorts to its cached state and does not wait excessively for a response from a query operation.

BR sends a query, during each polling interval, to the set of resources managed for a given RS to collect, for example, state, RTO metrics, operation execution timings, properties associated with 1st level state aggregation rules and properties associated with triggers for pairing rules. Roundtrip times and clock variations are also recorded. Part of the information collected is recorded into a log and part is used to update the BR management data maintained in DB2® tables and cached in DB2® buffer pools.

2) Use of Periodic Data Refresh to Maintain Running Average of Resource Operation Execution Duration Time:

BR uses observed resource information to create representations of customer IT environments referred to as Pattern System Environments. Observed resource operation execution duration times are related to PSE(s) and used to formulate statistics on operation execution times. During ongoing runtime execution, BR maintains a running average of resource operation execution times. Statistics from logs of observations are used as a base against which updates are made from data returned by resources in response to periodic polling. Running averages for operation execution times are maintained by BR in a set of DB2® tables, which collectively relate resources to the business applications they support and operation execution times for those resources within the context of a customer environment represented as a PSE. The running average of operation execution time for resources is utilized in validating customer policy for business application availability.

3) Use of Periodic Data Refresh in Evaluating Redundancy Group State:

A Redundancy Group is a BR representation of a set of functionally equivalent resources which have an associated aggregated state. The state of a Redundancy Group is updated when BR gathers information on resources either on a periodic basis or in response to a resource event reflecting an outage. The aggregated state of a Redundancy Group can be specified by a customer as a function of the state and property values of associated resources. The state of a Redundancy Group can be used by customers to affect the state of a Recovery Segment representing a business application. State of a Redundancy Group can also be used by customers in determining which pairing information is currently valid through trigger specifications.

4) Monitoring for Resource State Change and Use of Cached Data in Assessing Resource Aggregated State:

When state change notification for a resource is received, an assessment is performed based on, for instance, the administrative state of the Recovery Segment (RS), the state of the current policy for the RS, the rules for composed state of the resource and pairing information. If the resource is part of a RS for which there is an active BR policy governing availability management, change in resource state may warrant initiation of error processing. The composed state of the resource is evaluated to determine if it has become degraded or unavailable. If a resource changes state, as evaluated by BR for availability purposes, the associated RS may also change state or another resource related through a pairing may change state. Property/values associated with resources and state associated with resources are used from the BR cache to evaluate trigger conditions on pairings and composed state of other resources, and aggregated state of Redundancy Groups and Recovery Segments.

5) Monitoring for Resource Property Change and Use of Cached Data in Assessing Resource State:

In a manner analogous to processing for resource state change, resource property event notification initiates an assessment of resource composed state. Notification of property and related value is received by BR as a result of subscription. Notification results in update of the BR cache for the altered resource property and value. Assessment of composed state of the resource is performed. If the resource state, as viewed by BR for availability management changes, an assessment of changes to other resources or to the associated RS(s) is performed by BR. As with resource state change, changes in property/value for a resource may result in initiation of error processing through alteration of resource state, Redundancy Group state and ultimately Recovery Segment state.

6) Monitoring for Resource Topology Change and Alteration of Resource to Business Application Association:

BR subscribes for monitoring and change notification for these lifecycle changes, as examples:
Resources added to the environment;
Resources deleted from the environment;
Relationships added to the environment; and
Relationships deleted from the environment.

The addition of resources or relationships in the environment does not result in BR automatically changing the scope of any RS. The BR administrator is notified and may select to include the resource or relationship information into a RS. In so doing, the BR administrator may choose to build composed state or pairing information or alter RS and RG aggregated state processing.

In another implementation, a BR function enabling automatic addition of selected resources and relationships to a RS based on a set of filter rules is possible. Definition of which resources and relationships should automatically be added to a RS what if any composed state and pairing information should automatically be added is possible.

If the environment change reflects deletion of a resource, BR removes the resource from the RS and from related pairing information so as to prevent the removed resource from causing inappropriate evaluation of state for other resources. A resource being deleted implies it is no longer part of the IT environment. That is quite different from the resource being failed or degraded. It is gone and should not impact the state of other resources including the Recovery Segment. Notification is provided to the BR administrator and copies of the resource information, related metadata and pairing information are preserved for potential use by the BR administrator. Once deletion of the resource is confirmed by the BR administrator, copies of information related to the deleted resource are removed from BR, in one embodiment.

If the environment change reflects deletion of a relationship, BR removes any pairing information derived from the relationship and provides BR administrator notification. A temporary copy of the removed pairing information is preserved until the BR administrator confirms deletion of the relationship.

Example of Preconditioning the BR Environment for Monitoring

Prior to the detection of runtime errors, there are a number of BR-specific configuration steps performed. This list represents one example of a high-level view of those preconditions, although they are not necessarily executed in this order:

A Recovery Segment has been defined and deployed. The Recovery Segment includes various resources, relationships between those resources, topologies of resources and relationships, and composite resources (i.e., Redundancy Group or even other Recovery Segments).

The Recovery Segment has been associated with an instantiated and deployed BR Manager for monitoring and management. This association is accomplished in the form of a 'manages' relationship.

Relationships in the form of 'manages' relationships have been established between the Recovery Segment and its constituent resources.

Pairing rules have been assigned to the resources and relationships through interaction with the BR UI and customized to the customer's particular environment (e.g., impact rules for aggregated states for the RS, RG, etc.).

A goal policy has been defined and validated for the Recovery Segment through interactions with the BR UI.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

The underlying framework that BR relies upon provides a mechanism for subscribing to specific events and subsequently getting notified when those events occur. In one implementation, this may be via a notification service. The types of events that can be subscribed to are state change events and lifecycle events, as examples. State change events result when a property of a resource changes, and lifecycle events occur with either the creation and/or deletion of a resource instance. This subscription/notification process is the basis for error detection by BR. Notifications are surfaced to the subscriber, and the subscribers for BR are, for instance, the Recovery Segment or BR manager.

As a result of the preconditions leading up to runtime, the following subscriptions have taken place (again not necessarily in this order), in one embodiment:

1. The BRM has subscribed to runtime state change events for the RS (as a result of the Recovery Segment getting associated with that particular BRM).
2. Once a RS is defined, instantiated and has relationships defined with its constituent resources, lifecycle changes to the topologies in the RS are to be monitored. For example, changes, such as the addition of a relationship between a resource in the RS and related resource, may be an indication that the customer may need to (or want to) change the definition of the RS to include new resources or possibly change the policy associated with the Recovery Segment. It is for this reason that the Recovery Segment has subscribed to lifecycle changes for the resources in the Recovery Segment. Note that a lifecycle change is different than an operational state change. Lifecycle events result when new resources are instantiated or explicitly destroyed.
3. Once a policy is activated for monitoring, the operational state of the resources in the Recovery Segment are also monitored. So, the Recovery Segment has subscribed to the state change events for those constituent resources.
4. Also, as a result of policy activation, the Recovery Segment has subscribed to state change events for any properties of its resources that are a RTO metric.
5. The Recovery Segment has subscribed to state change events on those properties that are involved in any of the pairing rules applied during configuration time.

Figure 9:
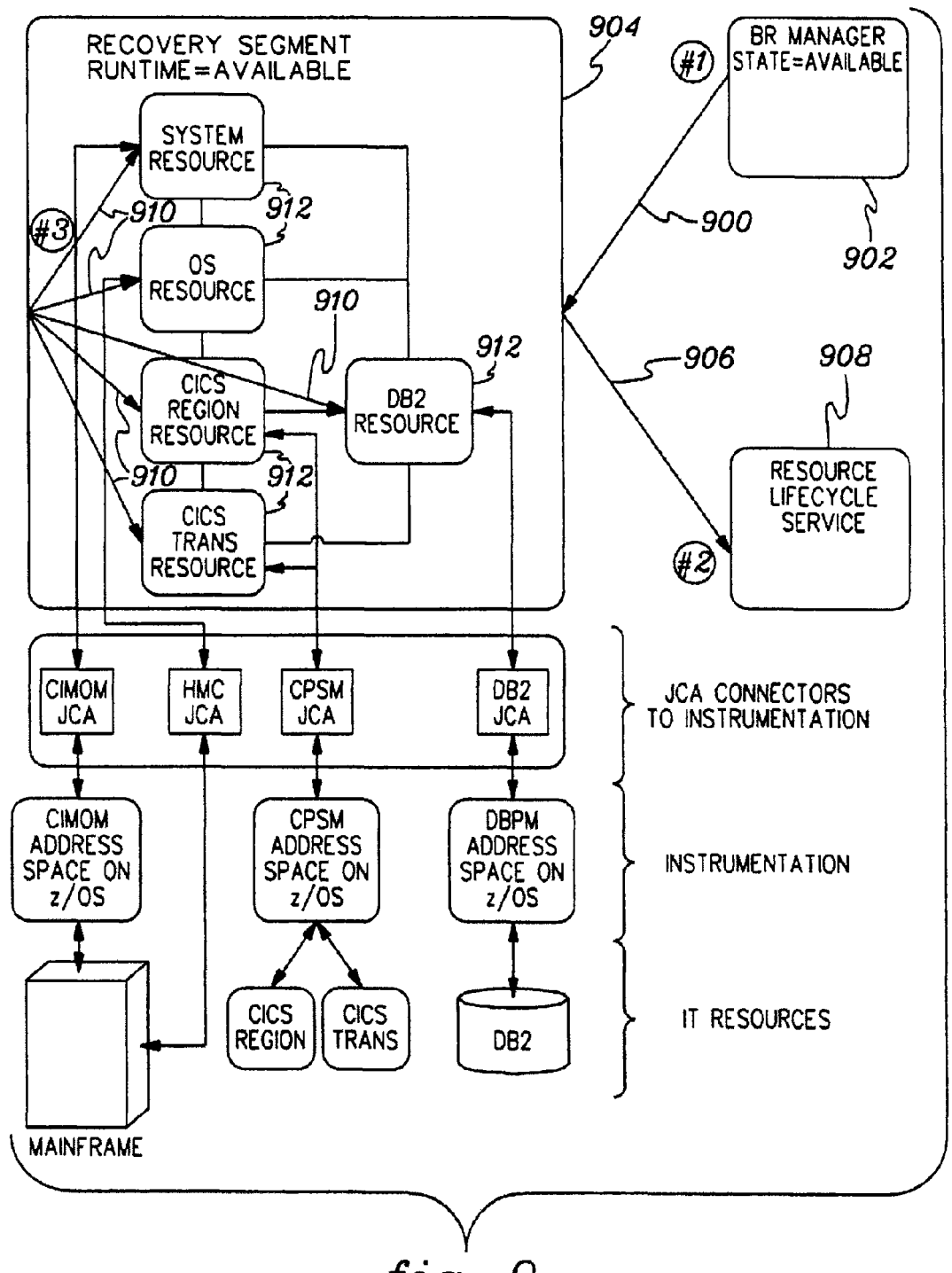
FIG. 9 depicts one example of a conceptual view of a Recovery Segment, in accordance with an aspect of the present invention.

A conceptual view of the above for a simple Recovery Segment with five constituent resources is depicted in FIG. 9.

1. Line 900 between the BR Manager 902 and the Recovery Segment 904 represents a state change subscription between BRM 902 and RS 904.
2. Line 906 between Recovery Segment 904 and the resource lifecycle services 908 represents the lifecycle change subscription for resources in the Recovery Segment.
3. Lines 910 between Recovery Segment 904 and its constituent resources 912 represent the state change subscriptions between the RS and those resources. There is at least one subscription between the RS and each resource for operational state change events, but there might be others as well based on items 4 and 5 above.

As used herein, lifecycle service refers to the function which provides notification of a resource being created or destroyed. It may be different for different resources. For example, it might be a software routine which runs when a customer adds or removes a resource definition from their CMDB. It could be a software routine which runs when a new subsystem, like CICS® or DB2®, is installed or when a new instance of the subsystem is defined through creation of a new start procedure in sysl.proclib. It could be a software routine which runs when a new storage subsystem is installed to define the storage subsystem hardware configuration and validate correct installation and execution of the new hardware. All of these are providing notification that a new instance of a component/resource has become available in the IT environment. In a similar way, when a component/resource is removed from the IT environment the lifecycle service provides notification. For example, if a rack of x86 servers is to be replaced, the old instances of the servers are removed. The software providing notification of the removal could again be running when the customer's CMDB is updated. Or, it would be run when the customer's hardware inventory is updated. All of these are lifecycle services. For relationships, there are similar software routines which are the focal point for creation or removal of new relationship instances and these are lifecycle services for relationships. For example, when a new JDBC connector is defined for software using a database, a new relationship is created between the software and the database.

Now that BR has subscribed for the various state and lifecycle change events for the resources under its management, it waits and listens for a notification for anything that is has subscribed to. The lifecycle runtime state of the Recovery Segment at this point in time is Available.

Activate Observation Mode for RS

Activate Observation Mode initializes the mode where the RS initiates periodic polls to collect information used in forming system environments, as well as to perform ongoing collection of key information used to keep the BRMD and BRRD current. Once activated, observations are gathered until the administrator explicitly stops the poll. Observation mode is activated by the BR Administrator or by policy validation for the first policy to be validated for the RS, if it has not been set by the administrator prior to that time. Note that activation of observation mode does not cause the RS to subscribe to resource state, resource property or resource lifecycle changes. Therefore, deactivation of observation mode does not unsubscribe.

One embodiment of the logic to activate observation mode for a RS is described with reference to FIG. 10. As one example, the RS component of the BR performs this logic.

Figure 10:
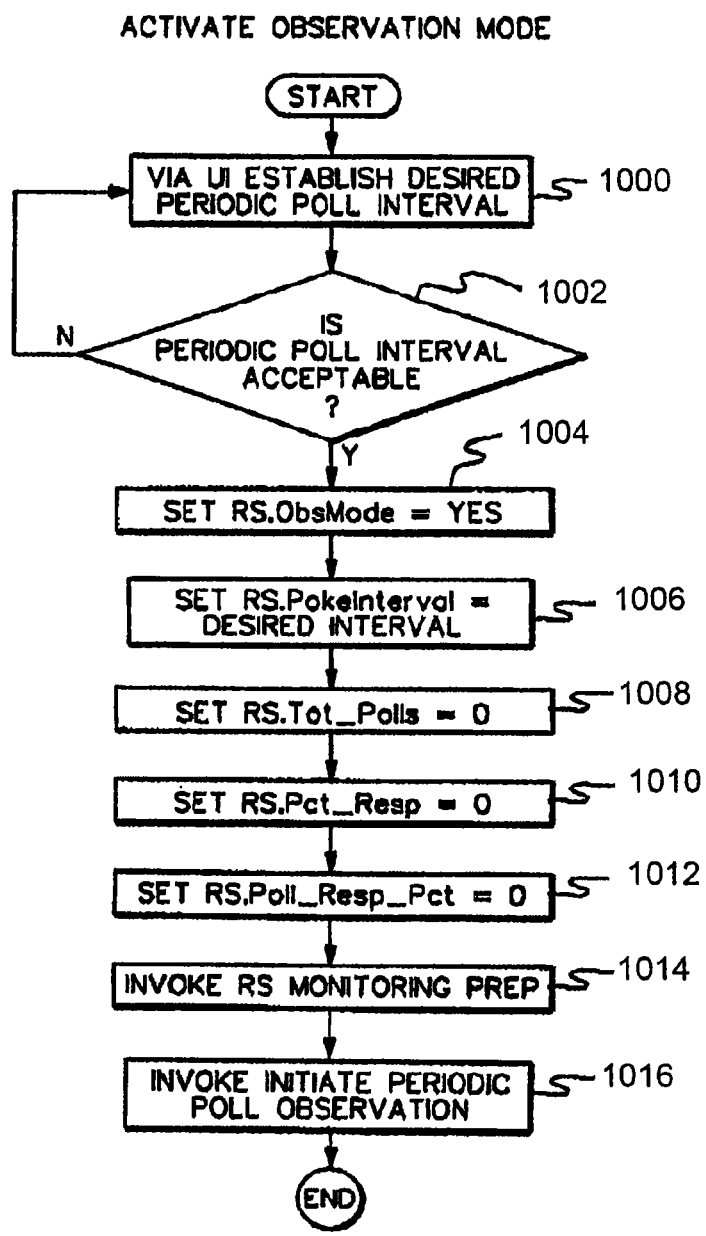
FIG. 10 depicts one embodiment of the logic to activate observation mode, in accordance with an aspect of the present invention.

Referring to FIG. 10, the periodic poll interval desired by the BR administrator is established through the UI, STEP 1000. The specified interval is validated including, for instance:

Interval greater than 0;

Interval larger than 15 minutes yields a warning;

If previous cycles have had less than 100% response to batch requests (RS.Pct_Resp), lowering the interval yields a warning;

If previous cycles have had less than 100% response from all RS related resources (RS.Poll_Resp_Pct), lowering the interval yields a warning;

Interval less than the longest time for a resource to respond (RS.Level_T2_interval_max), yields a warning.

When an acceptable periodic poll interval has not been requested, INQUIRY 1002, processing returns to STEP 1000. Otherwise, observation mode for the RS is indicated (RS.ObsMode=Yes), STEP 1004, and the desired interval is saved with the RS (RS.PokeInterval), STEP 1006.

Statistics for the polling cycle are initialized. For example, the total number of poll cycles with the specified interval is set to zero (RS.Tot_Polls), STEP 1008, the percent of responses for batch requests is set to zero (RS.Pct_Resp), STEP 1010, and the percent of resources responding in a polling cycle is set to zero (RS.Poll_Resp_Pct), STEP 1012.

Preparation for polling of resources is invoked (e.g., RS Monitoring Prep), STEP 1014, to create the list of resources and resource data to be retrieved on each polling cycle, as described below. Moreover, processing to periodically present requests to resources for data is also invoked (e.g., Initiate Periodic Poll Observation), STEP 1016, as described below.

RS Monitoring Prep

As previously indicated, activate observation mode invokes RS monitoring prep (as well as RS monitoring of Resources), an example of which is described with reference to FIGS. 11A-11B. In one embodiment, this logic is performed by the RS component of the BR system.

A list of resource data for RS observation mode or active monitoring is created in this routine. It is invoked when observation mode is made active, as described above, or when the RS transitions to active monitoring of resources to achieve the availability policy, as described below. This routine builds the list of resource data in the RS (RS.BRAD_List) under the constraint that each piece of resource data is to be requested separately. In another implementation where support is provided by the resource for retrieving multiple data in a single request, this routine would build the list so groups of data requests to the same resource would be presented in a single resource access. Resource data may include, for example: resource state, resource operations or resource property data required for evaluation of pairing triggers, RS evaluation of RTO metrics or RG and RS state evaluation.

Figure 11A:
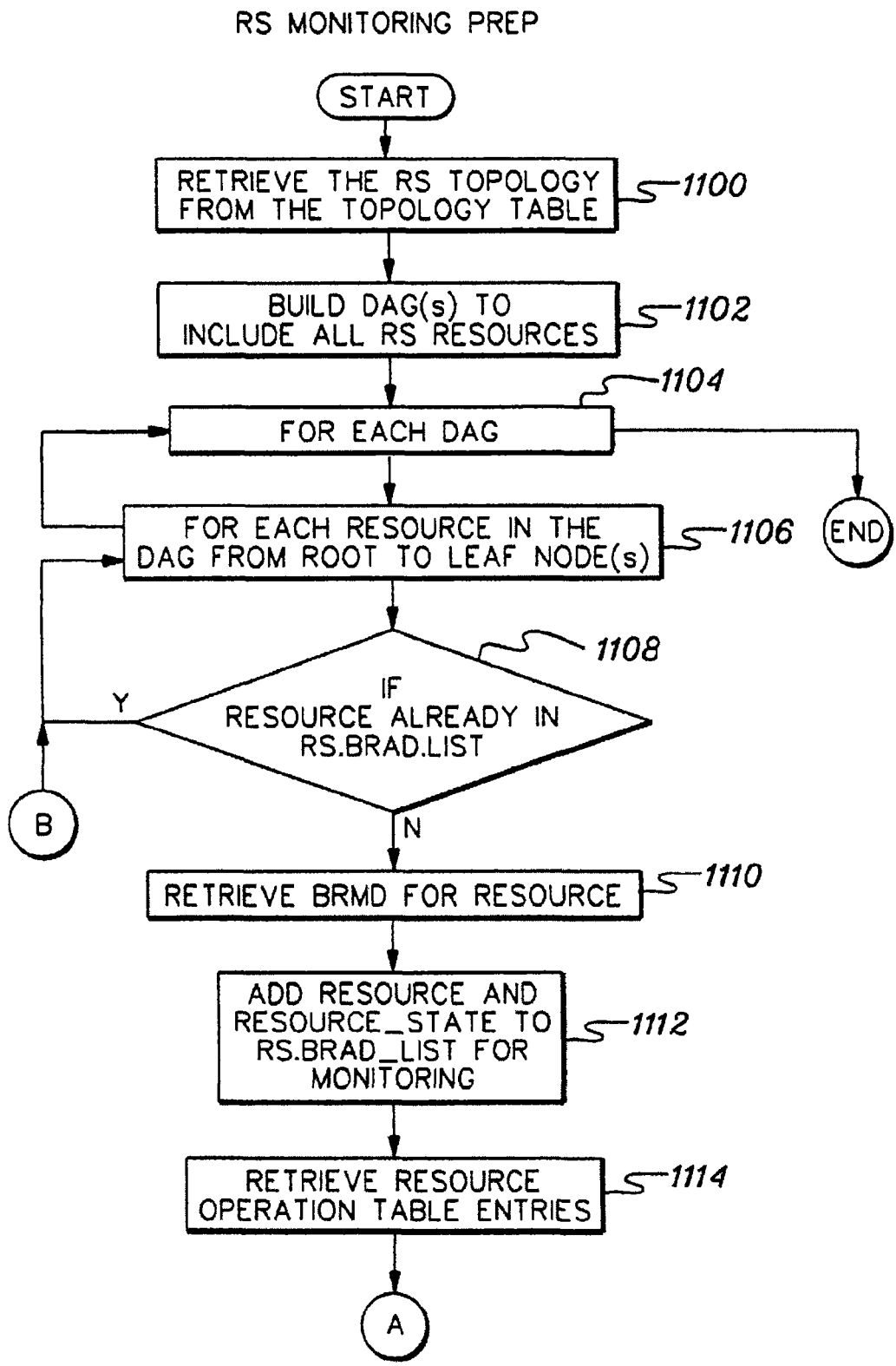
FIGS. 11A-11B depict one embodiment of the logic to prepare for RS monitoring, in accordance with an aspect of the present invention.
Figure 11B:
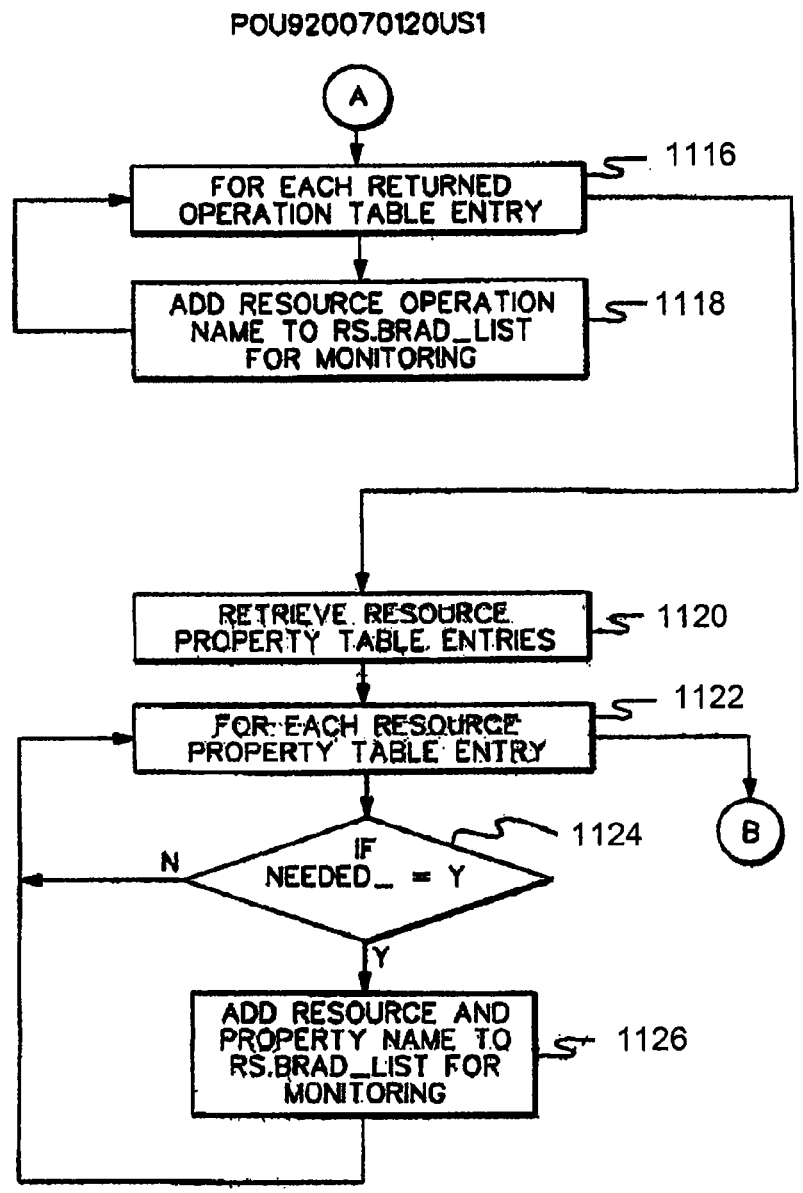

Referring to FIG. 11A, the resource topology associated with the RS is retrieved from the RS related topology table, STEP 1100. One or more DAG(s) are constructed for the resources represented in the topology, STEP 1102. DAG(s) are processed from the root to the leaf nodes resulting in entries in the resource data list being in root to leaf order. Subscriptions for monitoring of resources are built in the order of resource data, such that subscriptions are processed from root to leaf node.

When each constructed DAG has been processed, STEP 1104, this routine ends. Each resource in a DAG is processed navigating the DAG from the root to leaf node(s), STEP 1106. If the resource under evaluation has already been processed, INQUIRY 1108, the next resource in the DAG is evaluated, STEP 1106. Otherwise, the BRMD is retrieved for the resource, STEP 1110, and the resource and a request for the resource state data is added to the list of resource data required by the RS, STEP 1112, and flagged as requiring event subscription.

For the resource under evaluation, operation table entries are retrieved through use of the BRMD, STEP 1114. For each operation table entry, STEP 1116 (FIG. 11B), the resource and resource operation are added to the list of resource data needed, STEP 1118, and flagged as not requiring event subscription.

Subsequent to processing the retrieved operation table entries, the properties associated with the resource under evaluation are retrieved through use of the BRMD, as one example, STEP 1120. For each property table entry retrieved, STEP 1122, a determination is made regarding RS requirements for data on the property, INQUIRY 1124. A set of flags in the property table indicate if the property/value is needed for currency evaluation of one of the pairing types or needed for gathering RTO metrics or needed for RG or RS state evaluation. As examples:

Needed for RG evaluation
  NEEDED_RG_TRIGGER_Y
Needed for pairing trigger
  NEEDED_IMPACT_Y
  NEEDED_FAILURE_Y
  NEEDED_CONSTRAINT_Y
  NEEDED_OPEFFECT_Y
  NEEDED_PREPEFFECT_Y
  NEEED_COLLOCATION_Y
Needed for RS state evaluation
  NEEDED_LEVEL1_AGGREATION_Y
Needed for RTO metrics
  NEEDED_RTO_Y If not, INQUIRY 1124, the next property is evaluated, STEP 1122. Otherwise, the resource and property are added to the list of resource data required by the RS, STEP 1126, and flagged as requiring event subscription. When all resource property table entries have been processed, the next resource is evaluated, STEP 1106 (FIG. 11A). When all of the resources in the DAG have been processed, STEP 1106, the next DAG is selected, if any.

Initiate Periodic Poll Observation

In addition to RS monitoring prep, an initiate periodic poll observation routine is also invoked by activate observation mode. With this routine, in each polling interval, BR sends a query to the set of resources managed for a given RS to collect, for instance, state, RTO metrics, operation execution timings, properties associated with evaluation of resource composed state and properties associated with triggers for pairing. A part of the information collected is used to update the BRMD and BRRD information. Collected data may be recorded in a log for use by tools evaluating the BR environment.

In one implementation the process to request data from resources runs only when invoked by this routine. Setting of a timer to cause this routine to run the next cycle is performed by this routine. The following flow represents such an implementation.

In another implementation, one in which BRAD processing is employed to dynamically adjust resource data collection controls, the initial invocation of the BRAD process is all that is required. Subsequent iterations of the periodic poll process and detection of requests to terminate the periodic poll process are incorporated into the BRAD logic.

One embodiment of the initiate periodic poll observation is described with reference to FIG. 12. As an example, the RS component of the BR performs this logic.

Figure 12:
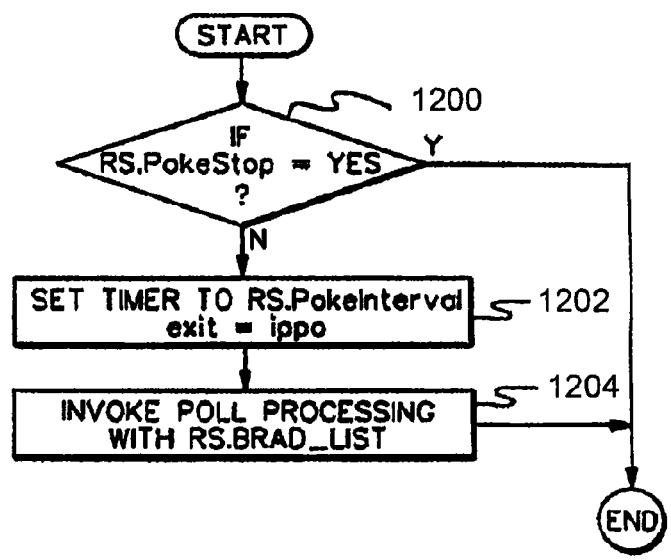
FIG. 12 depicts one embodiment of the logic to initiate periodic poll observation, in accordance with an aspect of the present invention.

Referring to FIG. 12, if periodic polling for data is to be stopped, INQUIRY 1200, processing ends. Otherwise, a timer is set to expire at the conclusion of a time interval equal to the periodic poll interval with control to be given to this routine, STEP 1202. The list of resource data recorded into the RS from previous processing of the RS Monitoring Prep routine, described above, is used to invoke services for delivering requests to resources for data and gathering response data from resources, STEP 1204. In one implementation, this may be the BR asynchronous distribution (BRAD) mechanism. In another example, it may be a routine which serially invokes the resource provided interface to retrieve each piece of data in the BRAD_List. An alternative implementation may spawn a thread for each data item in the BRAD_List assigning each thread one of the data requests.

Response to Periodic Poll Observation

Response(s) received from a periodic poll observation are processed. Property values and resource state may be updated. If a resource state is not available, a resource outage may be detected causing error detection processing to be initiated.

One embodiment of the logic to process received responses is described with reference to FIGS. 13A-13G. As an example, the RS performs this logic.

Figure 13A:
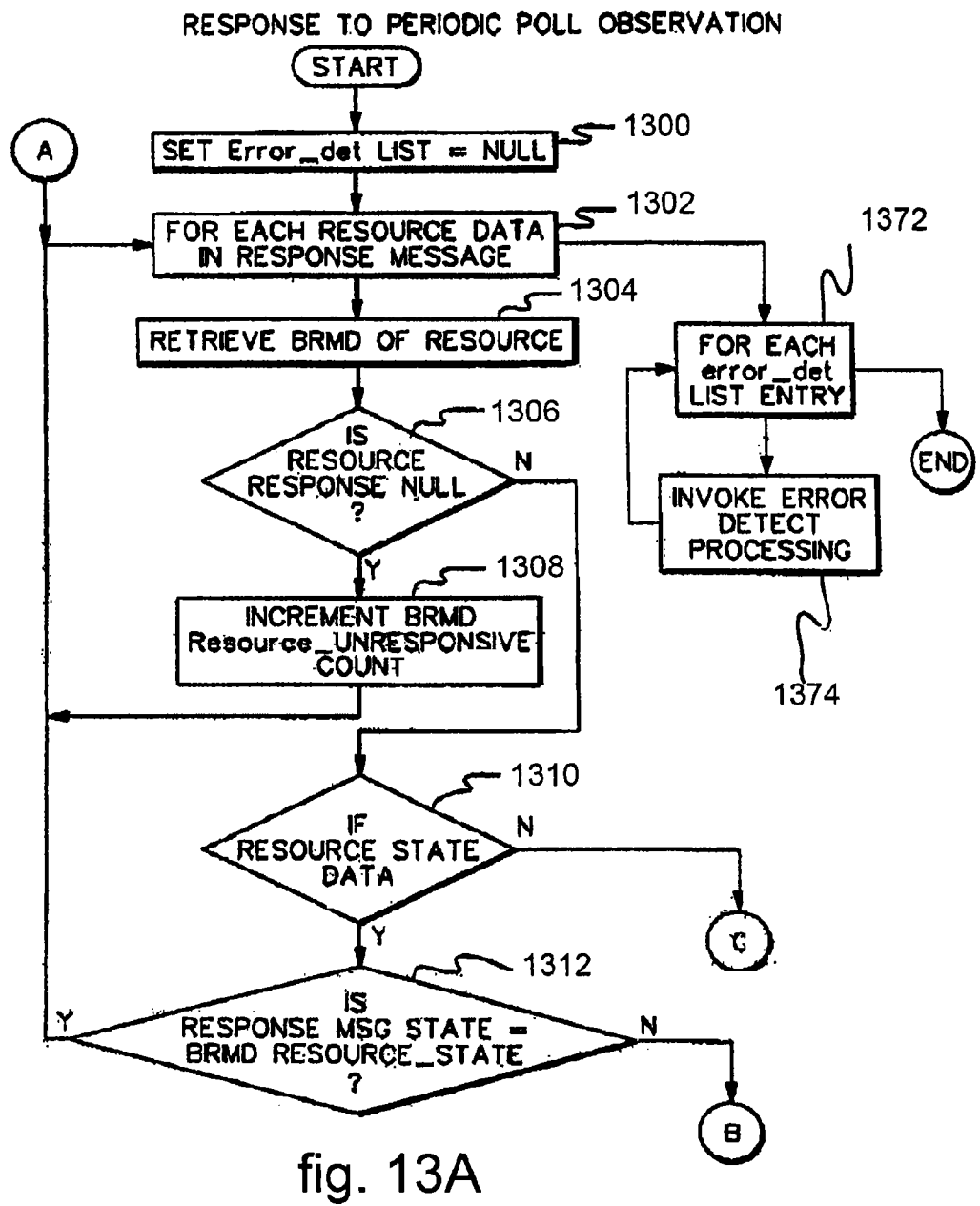
FIGS. 13A-13G depict one embodiment of the logic to respond to periodic poll observation, in accordance with an aspect of the present invention.
Figure 13B:
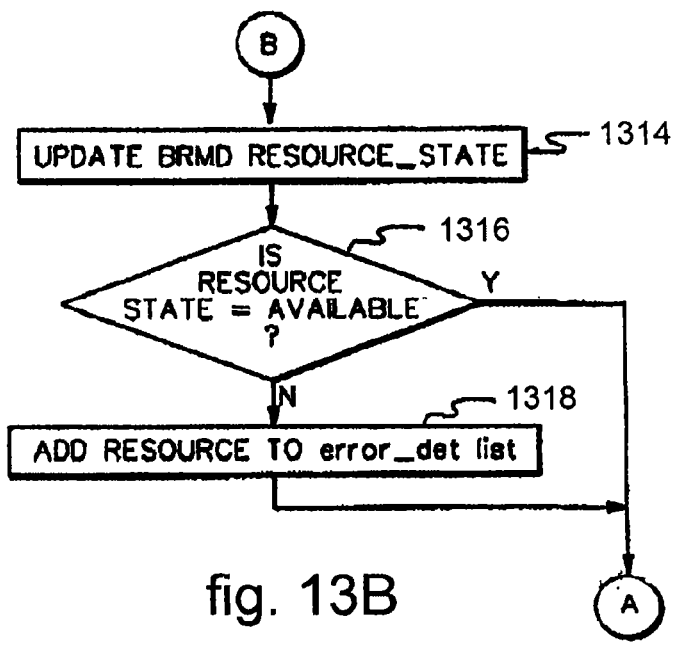
Figure 13C:
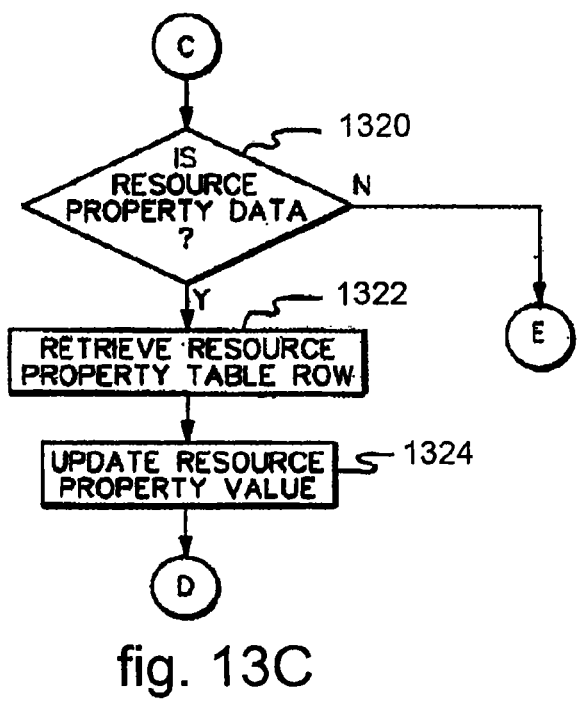
Figure 13D:
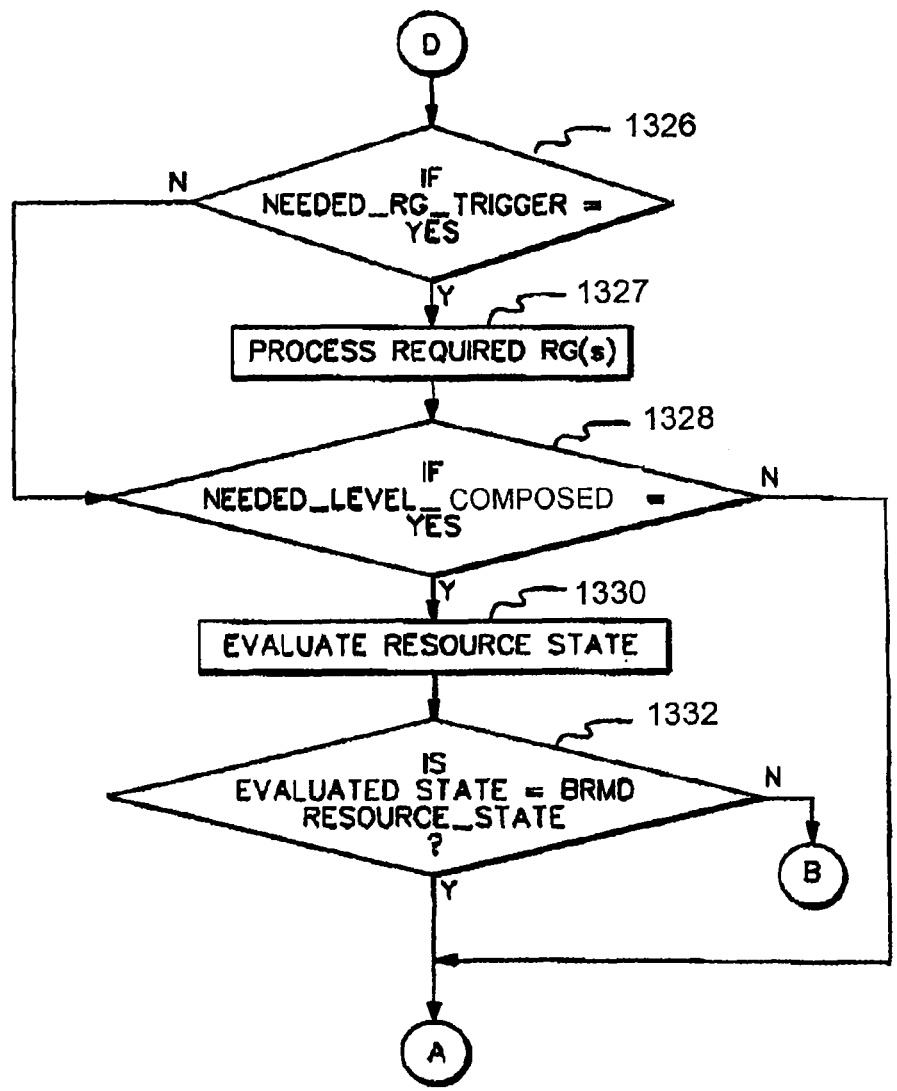
Figure 13E:
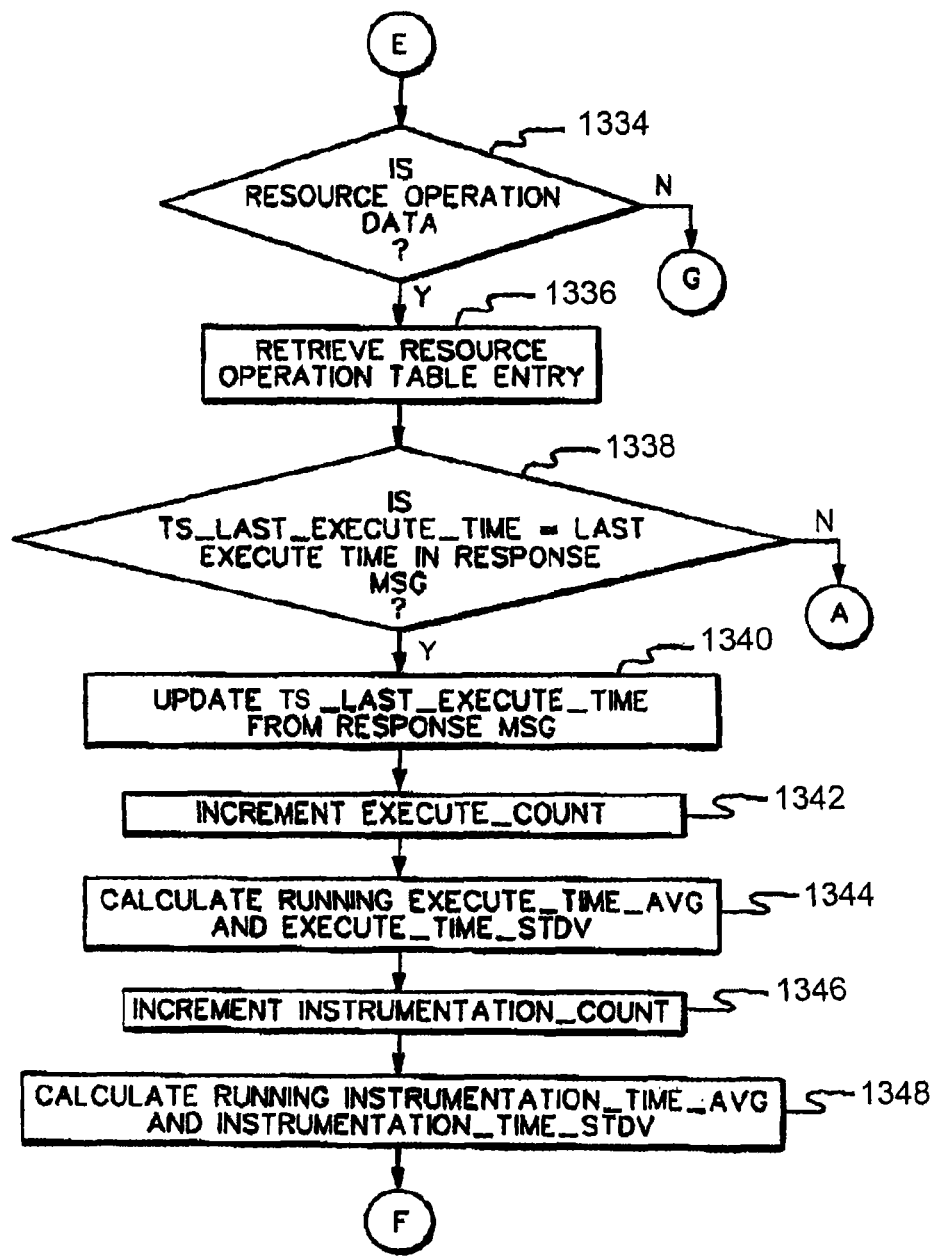
Figure 13F:
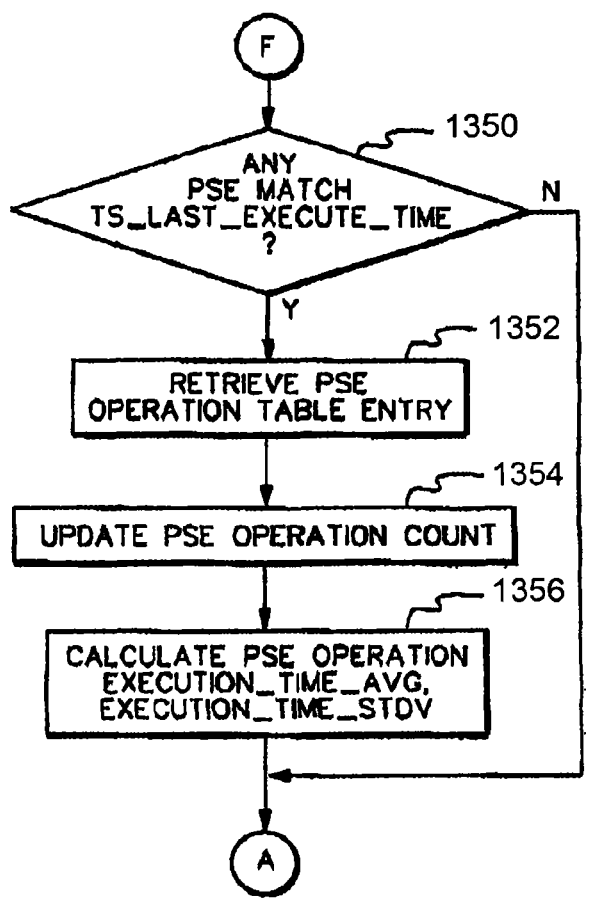
Figure 13G:
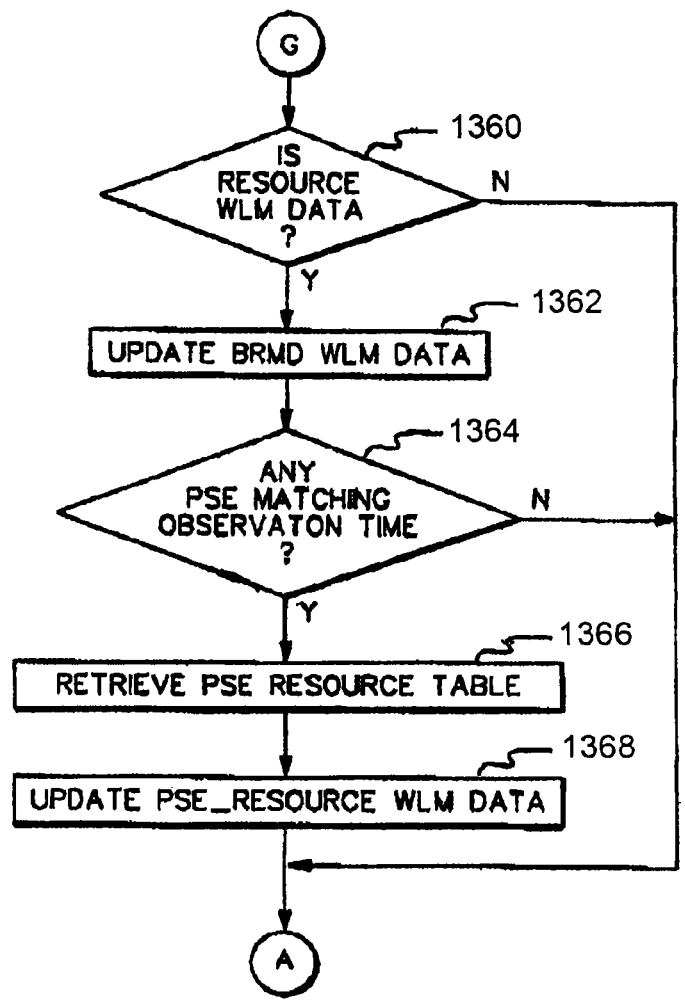

Referring to FIG. 13A, a temporary list of resources having reported or been evaluated as requiring error processing is set to null, STEP 1300. Each resource data item present in the response message is processed, STEP 1302. The BRMD for the resource being processed is retrieved, STEP 1304.

If the response data for the resource in the periodic poll response is null, INQUIRY 1306, the count of occurrences when the resource failed to provide a response is incremented, STEP 1308, and the next resource data in the response message is processed, STEP 1302.

Otherwise, INQUIRY 1306, if the resource data is state data, INQUIRY 1310, a comparison to the current BRMD resource state is made. If the resource state is unchanged, INQUIRY 1312, the next resource data is processed, STEP 1302. Otherwise, the BRMD resource state is updated, STEP 1314 (FIG. 13B), and a determination is made if the state is available, STEP 1316. If the resource state is available, the next resource data is processed, STEP 1302 (FIG. 13A). Otherwise, the resource having a non-available state is added to the error detect list of resources, STEP 1318 (FIG. 13B), and processing continues at STEP 1302 (FIG. 13A).

Returning to INQUIRY 1310, if the resource data is not state data, but is property data, INQUIRY 1320 (FIG. 13C), the resource property table entry is retrieved, STEP 1322, and updated, STEP 1324. If the resource property data is required for RG evaluation, INQUIRY 1326 (FIG. 13D), related RG(s) are evaluated, STEP 1327. Otherwise, or after RG evaluation is performed, it is determined if the property data is needed for resource state evaluation, INQUIRY 1328. If not, the next resource data is processed, STEP 1302 (FIG. 13A). Otherwise, INQUIRY 1328, evaluation of resource state is performed, STEP 1330. If the evaluated resource state is the same as the existing BRMD value, INQUIRY 1332, the next resource data is processed, STEP 1302 (FIG. 13A). Otherwise, INQUIRY 1332 (FIG. 13D), processing of changed resource state is performed, STEPs 1314-1318 (FIG. 13B), before the next resource data is processed, STEP 1302 (FIG. 13A).

Returning to INQUIRY 1320 (FIG. 13C), if the resource data is not property data, but is operation data, INQUIRY 1334 (FIG. 13E), the resource operation table entry is retrieved, STEP 1336. If the last execution time for the operation recorded in the operation table entry is the same as the operation execution time in the response message, INQUIRY 1338, the next resource data is processed, STEP 1302 (FIG. 13A). Otherwise, INQUIRY 1338 (FIG. 13E), the last operation execution time is updated in the operation table entry, STEP 1340, and the operation execution count is incremented by one, STEP 1342. The average and standard deviation for operation execution is calculated and recorded in the operation table entry, STEP 1344. The count of invocations for the instrumentation for the operation is incremented, STEP 1346, and the running average and standard deviation for instrumentation execution time is updated in the operation table, STEP 1348.

If there exists a PSE which matches the operation execution time, INQUIRY 1350 (FIG. 13F), the PSE operation table entry is retrieved, STEP 1352. The count of operation execution events is incremented in the PSE operation table entry, STEP 1354, and the running average and standard deviation of operation execution time is updated in the PSE operation table entry, STEP 1356. On completion of PSE operation execution data, the next resource data is processed, STEP 1302 (FIG. 13A).

Returning to INQUIRY 1334 (FIG. 13E), if the resource data is not operation data, but is WLM data, INQUIRY 1360 (FIG. 13G), the BRMD WLM data is updated, STEP 1362. If there exists a PSE which matches the observation time, INQUIRY 1364, the PSE resource table is retrieved, STEP 1366, and the WLM data associated with the PSE resource table is updated, STEP 1368. Subsequently, or if no PSE matching the observation time or if the resource data is not WLM data, the next resource data is processed, STEP 1302 (FIG. 13A).

Returning to STEP 1302, when the resource data has been processed, each error detect list entry recorded during processing, STEP 1372, is used to invoke error detect processing (e.g., asynchronously), STEP 1374. When each of the error detect list entries is processed, the response to periodic poll observation is complete.

Topology Lifecycle Chance Notification

One example of a lifecycle change notification is described with reference to FIGS. 14A-14C. As one example, this logic is performed by the RS component of the BR system.

In one example, BR subscribes to lifecycle service for monitoring and change notification of: resources added to the environment; resources deleted from the environment; relationships added to the environment; and relationships deleted from the environment.

This logic is initiated by the Recovery Segment initially subscribing to the four lifecycle change events and subsequently receiving notification of such a change.

Figure 14A:
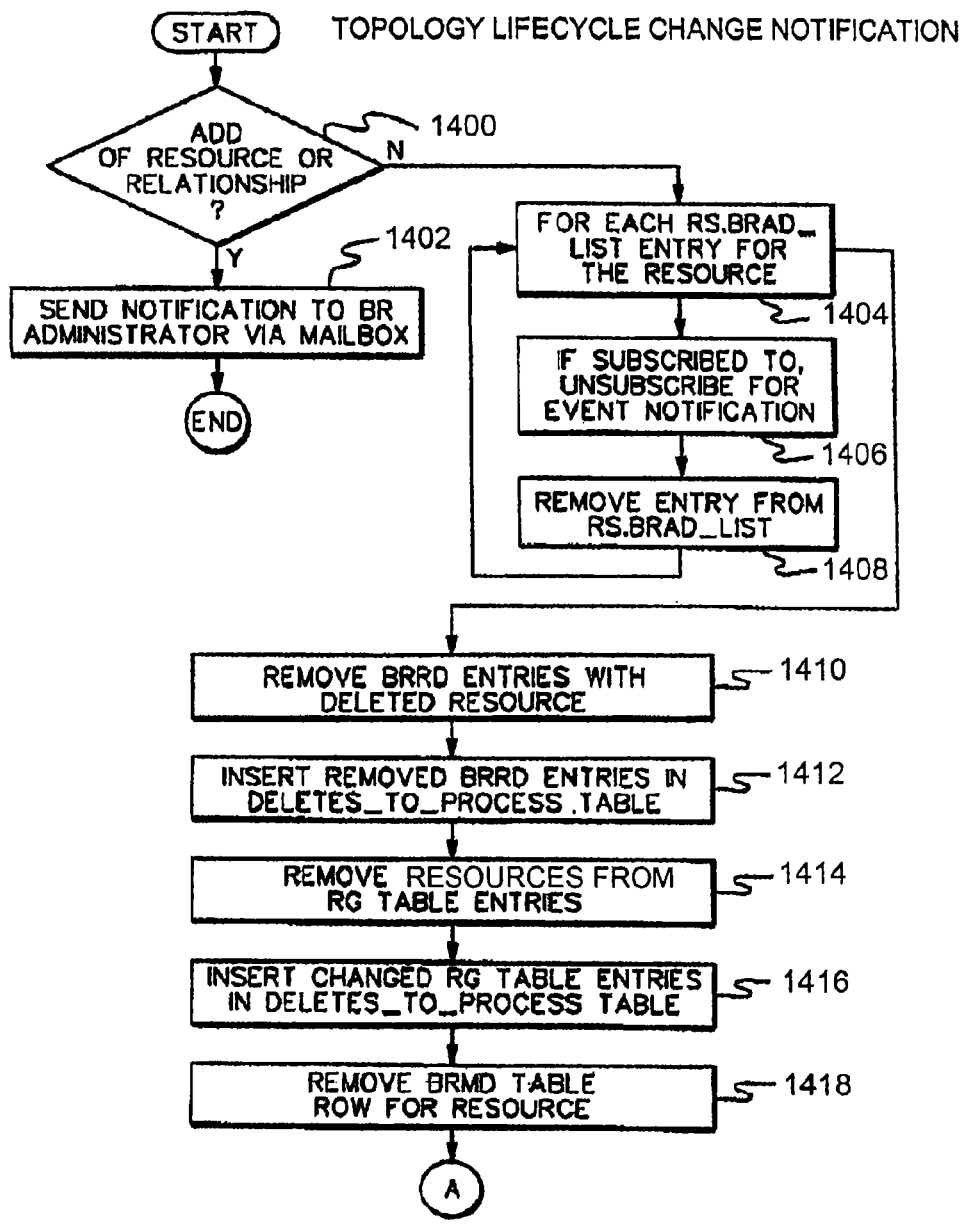
FIGS. 14A-14C depict one embodiment of the logic associated with topology lifecycle change notification, in accordance with an aspect of the present invention.

Referring to FIG. 14A, if resources or relationships have been added to the BR environment, INQUIRY 1400, notification is sent to the BR administrator via, for instance, the mailbox, STEP 1402. The BR administrator, on review of the changed environment, may choose to modify the BR environment through changes to existing RS(s) or formation of new RS(s). In another implementation, filters on resource type and resource property could be applied to events providing notification of resource or relationship additions. For example, an x86 server of a particular configuration could be matched to a filter, or a storage volume of a specified type and naming convention could be matched to a filter. If the added resource or relationship matched the filter for an RS, processing could be performed to add the resource or relationship along with best practices for pairings to the RS.

If a resource or relationship has been removed from the BR environment, INQUIRY 1400, monitoring of deleted items may be discontinued and updates are made to BR tables to reflect the deletion. For each resource data item as reflected in the RS.BRAD_List, (e.g., built during RS monitoring prep, described herein), STEP 1404, if the resource data item has been subscribed to based on indicator settings in the entry, subscription for event notification is terminated through, for instance, invocation of system services, STEP 1406. Further, the entry is removed from the RS.BRAD_List, STEP 1408, which terminates subsequent periodic poll cycle requests for the resource data.

Subsequent to processing the BRAD_List entries, flow continues at STEP 1410. At STEP 1410, BRRD entries, where the relationship is represented or where the deleted resource participates as Resource 1 or Resource 2, are deleted and inserted into a data structure of pending deletions, STEP 1412. As one example, the deleted data is recorded in a "deletes_to_process" external storage location accessible by the BR runtime and the BR administrator. In one implementation, the "deletes_to_process" store is a DB2® table. Other implementations may utilize a file system store or a log, such as the BR activity log.

Deleted resources are removed from any RG table entries, STEP 1414, and those modified RG table entries are recorded in the structure of pending deletions, STEP 1416. The BRMD of a deleted resource is removed, STEP 1418, and recorded in the structure of pending deletions, STEP 1420 (FIG. 14B).

Pairing(s) in the BRRD, where data related to the deleted resource is referenced in triggers (BRRD.TRIGGER), are updated to remove references to the deleted resource data, STEP 1422. Updated BRRD entries are recorded in the structure of pending deletions, STEP 1424. RG table entries where the deleted resource is referenced in RG state (RG.STATE_RULE) are updated to remove references to the deleted resource data, STEP 1426. Updated RG entries are recorded in the structure of pending deletions, STEP 1428. RS table entries where the deleted resource is referenced in the RS state (RS.STATE_RULE) are updated to remove references to the deleted resource data, STEP 1430. Updated RS entries are recorded in the structure of pending deletions, STEP 1432.

Mailbox notification is sent to the BR Administrator, STEP 1434, requesting confirmation of resources and relationship for which there exists pending delete processing.

Figures 14B, 14C:
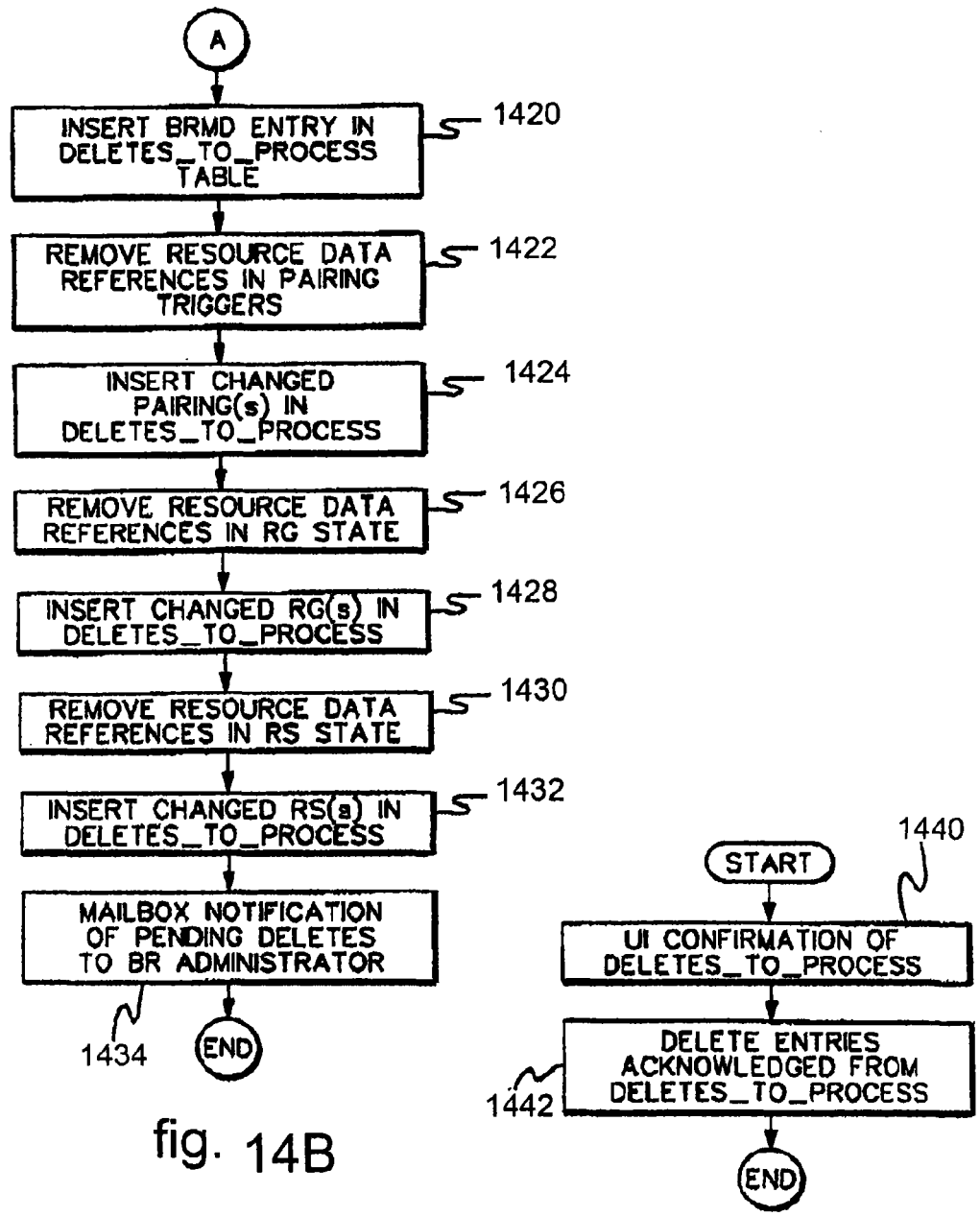

When the BR Administrator receives the mailbox notification and has initiated processing of pending deletes, recorded data from the table of pending deletions is presented for confirmation, STEP 1440 (FIG. 14C). On acknowledging delete processing for resources and relationship, pending delete table entries are removed, STEP 1442.

Chance Periodic Poke Interval

The interval at which the RS initiates a poll for query of information can be altered. The change takes affect on the next poll, and the scope of the change is for a RS. Processing is initiated through the UI by the BR administrator.

Note, in one implementation, historical information on the periodic poll process may be presented to the BR administrator. Historical information may include changes made to the number of resources in a batch, number of BRAD responses and number of resources responding for previous poll cycles. Trend data showing the effects of dynamic changes to the periodic poll control mechanisms may be presented to assist the BR administrator in setting a new periodic poll interval. Periodic poll control mechanisms include, for example: initiation of requests to previous poll cycle non responsive resources first, number of concurrent requests for resource data, number of requests in a batch, and duration of the periodic poll interval.

One embodiment of the logic to change the periodic poke interval is described with reference to FIG. 15. As one example, this logic is performed by the RS.

Figure 15:
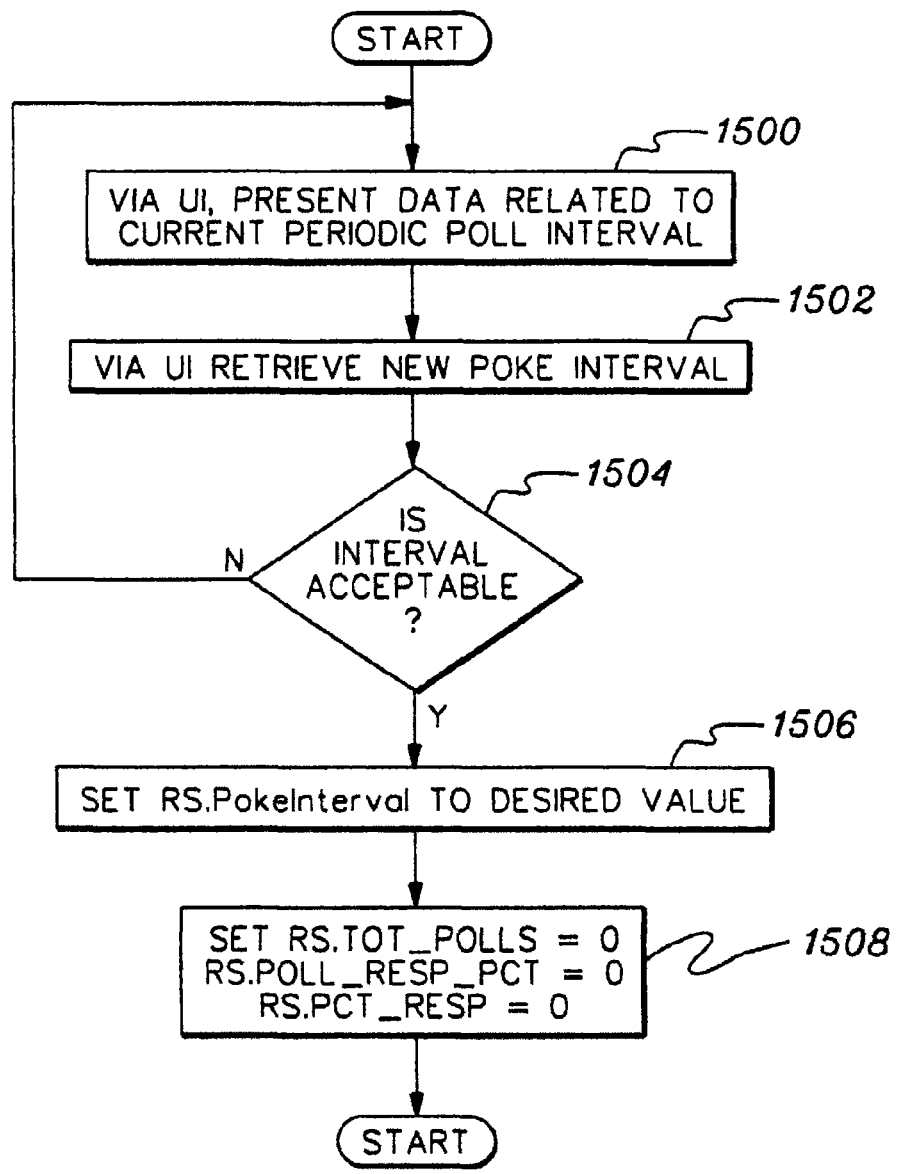
FIG. 15 depicts one embodiment of the logic to change a periodic poke interval, in accordance with an aspect of the present invention.

Referring to FIG. 15, data related to the current periodic poll interval is presented to the BR Administrator through the UI, STEP 1500. Data may include, for instance: the current periodic poll interval, the total number of poll cycles that have been completed with the current periodic poll interval, the percentage of responses which have been received to groups of requests for resource data, the percentage of resources responding in a poll cycle to requests for data, and the longest time interval from a request for resource data to the corresponding response. Through the UI, the BR Administrator specifies a desired periodic poll interval, STEP 1502. The specified interval is evaluated using the same criteria as when observation mode was initiated, as described above.

If the specified interval is not acceptable, INQUIRY 1504, UI interaction continues, STEP 1500. Otherwise, the desired interval value is used to update the RS periodic poll interval, STEP 1506. Statistics regarding the current periodic poll interval are reset, STEP 1508, including, for instance, setting to zero: total number of poll cycles with this interval, percent of responses which have been received to groups of requests for resource data, and the percentage of resources responding in a poll cycle to requests for data. Processing completes with use of the modified periodic poll interval picked up on the next cycle of the periodic poll process in the Initiate Periodic Poll Observation routine described above.

Deactivate Observation Mode for RS

Observation mode for the RS can be stopped to prevent further periodic polls from occurring until reactivation of observation mode. The BR Administrator explicitly invokes this operation, in one example.

One embodiment of the logic to deactivate observation mode is described with reference to FIG. 16. As one example, this logic is performed by RS.

Figure 16:
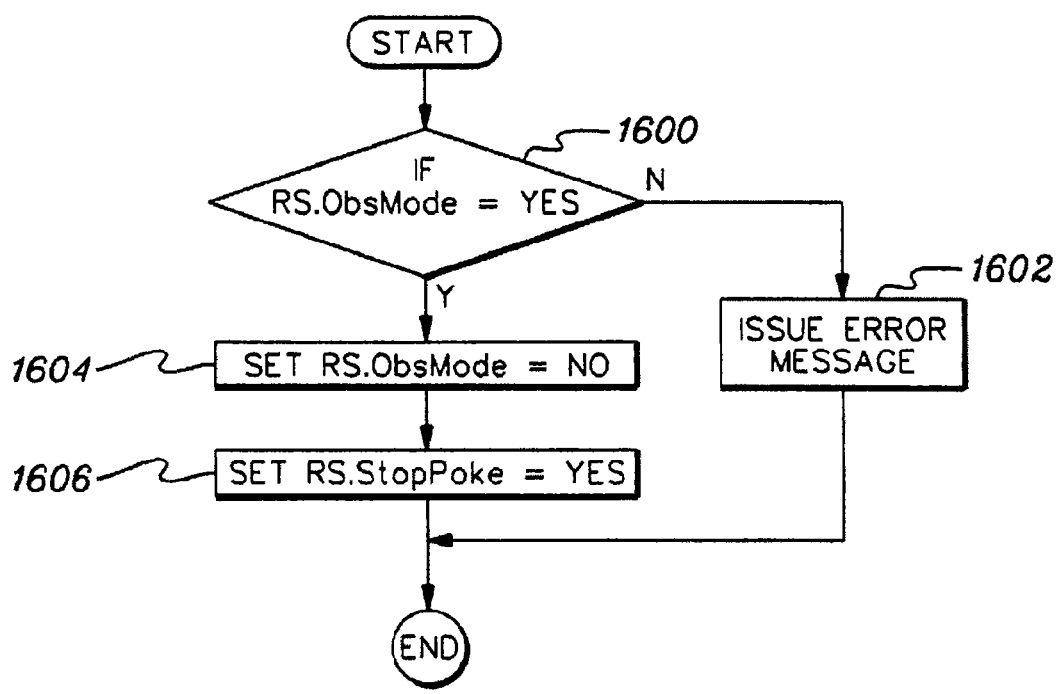
FIG. 16 depicts one embodiment of the logic to deactivate observation mode, in accordance with an aspect of the present invention.

Referring to FIG. 16, if the RS is not currently in observation mode, INQUIRY 1600, an error message is issued, STEP 1602. Otherwise, the RS is indicated to not currently be in observation mode, STEP 1604. Further, an indicator, checked by the periodic polling process, is set to cause periodic polling to end (RS.StopPoke), STEP 1606. Processing ends with further shutdown of the periodic poll process completed by the Initiate Periodic Poll Observation process.

RS Monitoring of Resource(S)—Activate Time

This flow is invoked from, for instance, activate policy (or in another embodiment, from another routine or independently), and initiates subscriptions to resources that have not already been subscribed to by this RS. Input to this routine includes the RS table data reflecting the resources associated with the RS. Some resources associated with the RS may have been subscribed to by the RS as a result of preparing the environment for meeting the specified policy goal. Requests to subscribe to resources are processed, for instance, in an order determined by the one or more DAG(s) reflecting relationships among resources in the RS. Processing of resource subscriptions proceeds from the root of the DAG to the leaf nodes, in one example.

One embodiment of the logic for RS monitoring of resources is described with reference to FIG. 17. As an example, the RS performs this logic.

Figure 17:
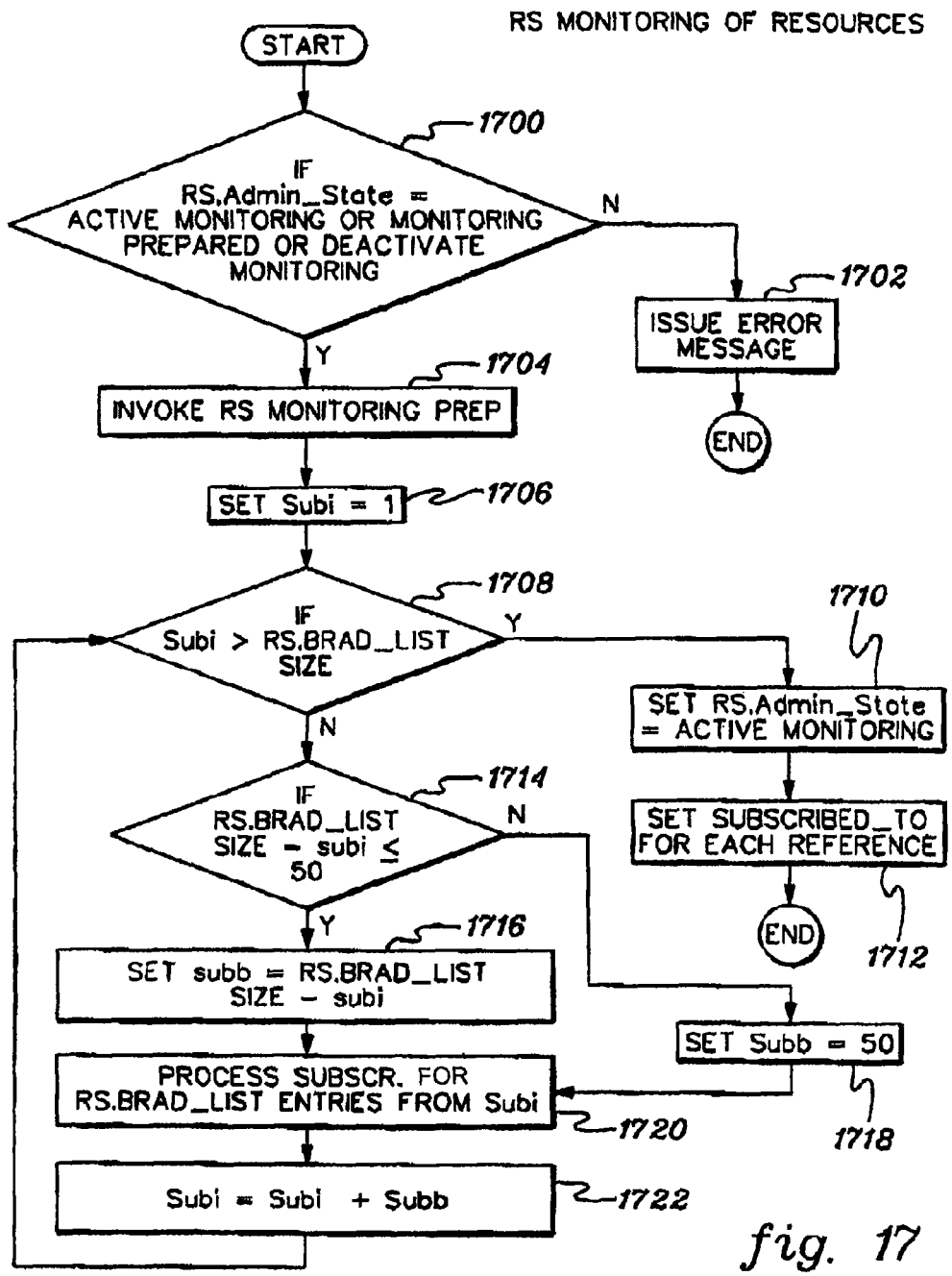
FIG. 17 depicts one embodiment of the logic associated with RS monitoring of resources, in accordance with an aspect of the present invention.

Referring to FIG. 17, the RS administrative state is to be one of ActiveMonitoring, MonitoringPrepared, or DeactivateMonitoring, STEP 1700. If the RS is not in one of those administrative states, an error message is issued, STEP 1702, and processing ends. Otherwise, the RS Monitoring Prep routine is invoked, STEP 1704, to build the list of resource data used to support RS.

On return from building the list of resource data, an index for processing subscriptions is initialized to one, STEP 1706. If all subscriptions have been processed, INQUIRY 1708, the RS administrative state is updated to ActiveMonitoring, STEP 1710. Further, the topology table entry for each resource is indicated as having been subscribed to, STEP 1712, and processing ends. Otherwise, INQUIRY 1708, if the number of remaining subscriptions to be issued is less than 50, INQUIRY 1714, the number of subscriptions to issue is set to the remaining count for the RS, STEP 1716. If the number of subscriptions remaining to be issued is greater than 51, INQUIRY 1714, the number of subscriptions for this cycle is set to 50, STEP 1718.

Subsequent to setting the number of subscriptions, subscriptions for resource data as reflected in the RS (RS.BRAD_List) are processed from the current index for the number to be done in this cycle, STEP 1720. The processing includes, for instance, invoking system services which cause the RS Monitoring Notification routine, described below, to be given control on change to the subscribed resource data. The SUBSCRIBED_TO1 indicator is set in the topology table for the resource. The index for the current processing of RS resource data subscriptions is updated for the number of subscriptions processed in this cycle, STEP 1722, and the need for another cycle is evaluated, INQUIRY 1708.

RS Monitoring Notification

One embodiment of the logic for RS monitoring notification is described with reference to FIGS. 18A-18B. As an example, this logic is performed by the RS component of the BR system.

When resource data change notifications are received at the Recovery Segment, they are assessed based on metadata associated with the property for that resource. Error detection is initiated at the Recovery Segment when a subscribed to resource publishes a state change notification or notification of change in a property value which alters the composed state of resources to not be available and the aggregated state of the RS to be unavailable or degraded.

Figure 18A:
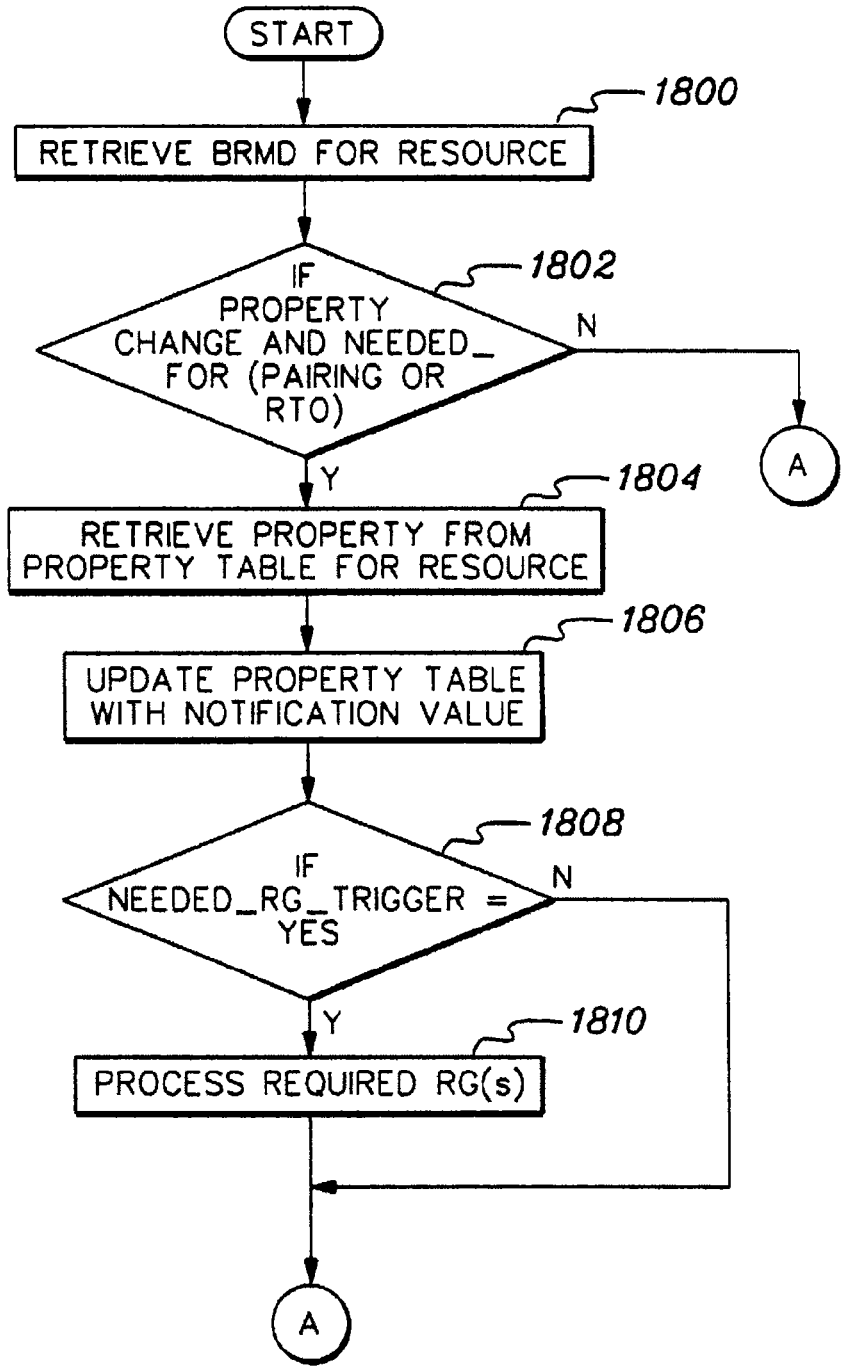
FIGS. 18A-18B depict one embodiment of the logic for RS monitoring notification, in accordance with an aspect of the present invention.
Figure 18B:
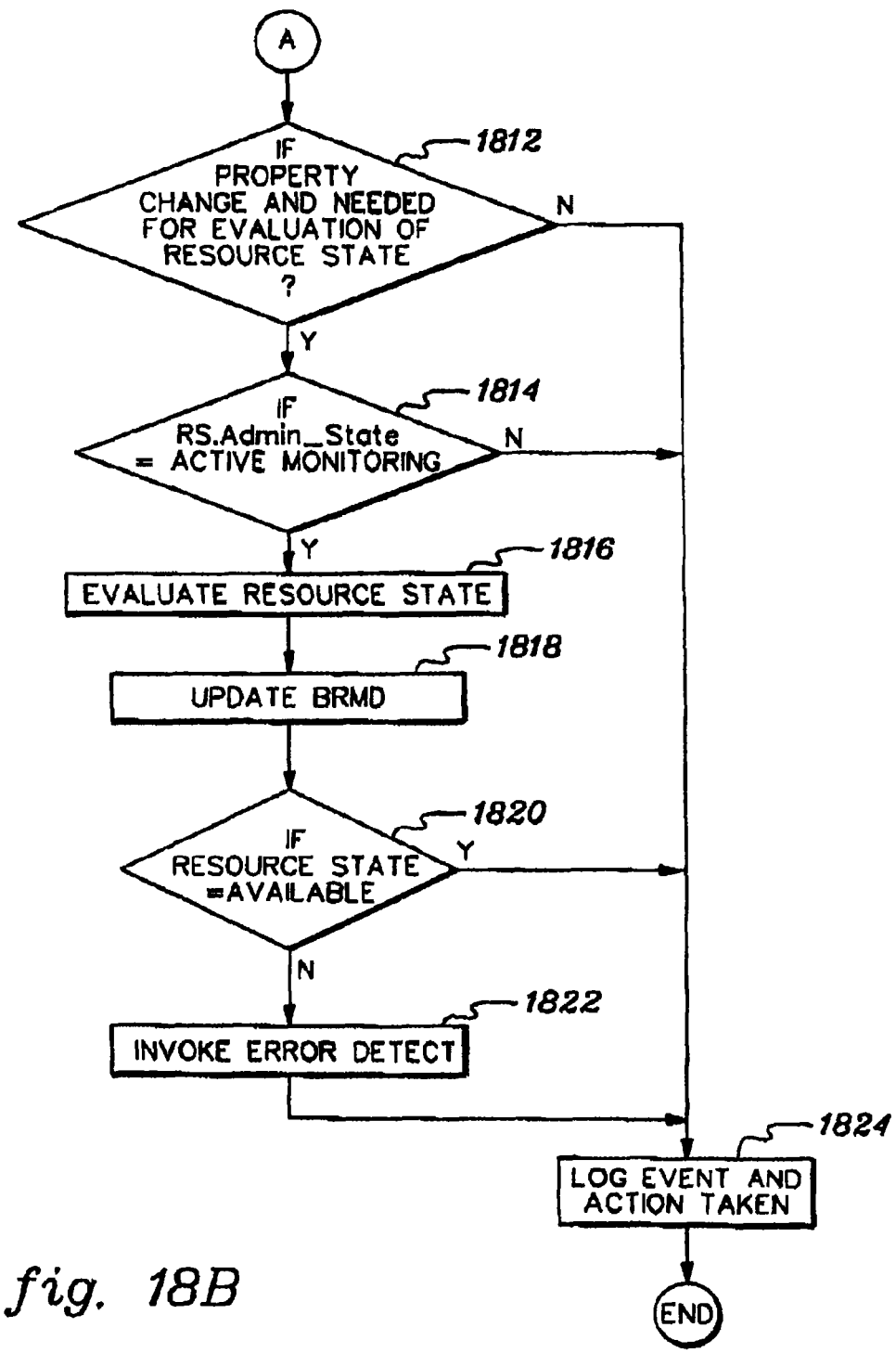

Referring to FIG. 18A, the BRMD of the resource is retrieved based on identification of the resource in the notification, STEP 1800. If the notification is for a property which is needed for pairing or RTO data processing, INQUIRY 1802, the associated property table entry for the resource is retrieved, STEP 1804, (in one implementation, the same property table flags are used as with INQUIRY 1224 (FIG. 12B)). The property table is updated with the property value provided in the notification, STEP 1806. Further, the settings of flags associated with the property table entry are tested to determine if an evaluation of RG state is required, INQUIRY 1808. If true, the RG is evaluated, STEP 1810, and processing continues with INQUIRY 1812 (FIG. 18B). If false, processing skips the RG evaluation and continues at INQUIRY 1812.

At INQUIRY 1812, if the property is needed for evaluation of resource state, and if the administrative state of the RS is "Active Monitoring", INQUIRY 1814, the state of the resource is evaluated, STEP 1816. The BRMD of the resource is updated with the evaluated state, STEP 1818, and the state of the resource is tested for being in an "Available" state, INQUIRY 1820. If the resource is not in an available state, error detect processing is initiated, STEP 1822. Thereafter, or if the resource state is available, the notification event is logged along with recording of actions taken in processing the event notification, STEP 1824, before processing ends.

Returning to INQUIRIES 1812 and 1814, if either evaluates false, processing continues at STEP 1824.

Deactivate RS for Monitoring

As described above, activation of monitoring of resources by a Recovery Segment results in subscriptions for notification events related to changes in resource state, property, operation and lifecycle.

Deactivate monitoring for a RS unsubscribes to the set of resources it manages, and leaves the environment 'prepared'. An administrator may be required to deactivate the RS for monitoring if changes to the RS are found to be disruptive to ongoing operations. For example, if resources are added to a RS which alter the preparatory actions required and those preparatory operations cannot be performed while the IT resources continue to provide service to the business applications represented by the RS, RS monitoring is deactivated.

One embodiment of the logic to deactivate RS for monitoring is described with reference to FIG. 19. As an example, the RS performs this logic.

Figure 19:
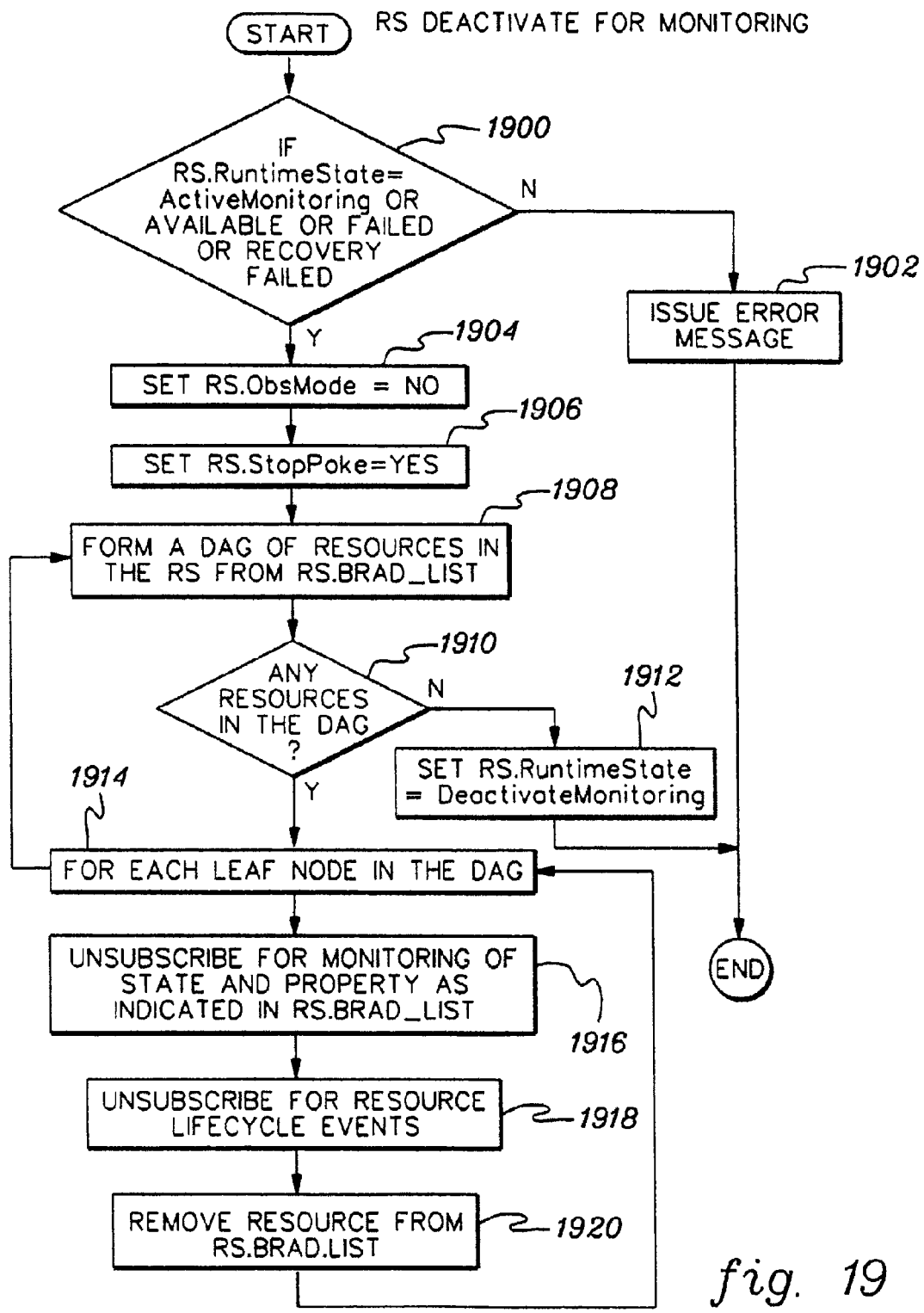
FIG. 19 depicts one embodiment of the logic to deactivate monitoring, in accordance with an aspect of the present invention.

Referring to FIG. 19, deactivate for RS monitoring can be performed if the runtime state of the RS is one of ActiveMonitoring, Failed or RecoveryFailed, INQUIRY 1900. Otherwise, an error message is issued, STEP 1902, and processing ends.

If the runtime state is in an allowed state, the RS is indicated as not being in observation mode, STEP 1904, and an indication to stop periodic poll processing is set, STEP 1906.

The list of resource data being monitored is used to build, for instance, one or more DAG(s) representing the resources associated with the RS, STEP 1908. As resources are processed, they are removed from the list of resource data being monitored resulting in subsequent DAG(s) having fewer resources. Unsubscribing to resources is performed from leaf nodes up the DAG(s) to root nodes, in one example. Ordering from leaf node(s) to root maintains logical consistency for reported events. Events which reflect outages in leaf nodes may cause error processing to evaluate resources on which the leaf node depends. Removing leaf nodes removes the possibility of actions taken on nodes nearer the root in the DAG to recover the leaf node. If an error is reported on a resource nearer the root in the DAG, root cause analysis causes the recovery of the node nearer the root in the DAG to be effected and there is no outage reported by the leaf node resources. If no resources exist in the constructed DAG, INQUIRY 1910, the RS runtime state is set to deactivate monitoring, STEP 1912, and processing ends. Otherwise, there are resources to be processed. Each leaf node in the formed DAG(s) is processed, STEP 1914, before reforming the DAG(s) to find the next level of resources, STEP 1908.

For each resource, monitoring of events is terminated, STEP 1906. Subscriptions for events related to changes in resource state, property, operation and lifecycle are removed, STEPS 1916-1918. Property value subscriptions may have been in effect in support of RTO metrics, resource property data supporting pairing rules or property data supporting evaluation of RS and RG state. The list of resource data being monitored is updated for the unsubscribed events, STEP 1920, and the next resource is processed, STEP 1914.

Described in detail herein is a capability for monitoring real-time data of a business application, in which the business application includes processing collectively performed by a plurality of components of the IT environment. Each component may include one or more resources, and the real-time data is associated with those resources. The real-time data includes, for instance, resource state, property/value data, operation execution time duration and/or performance data (e.g., utilization).

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 20:
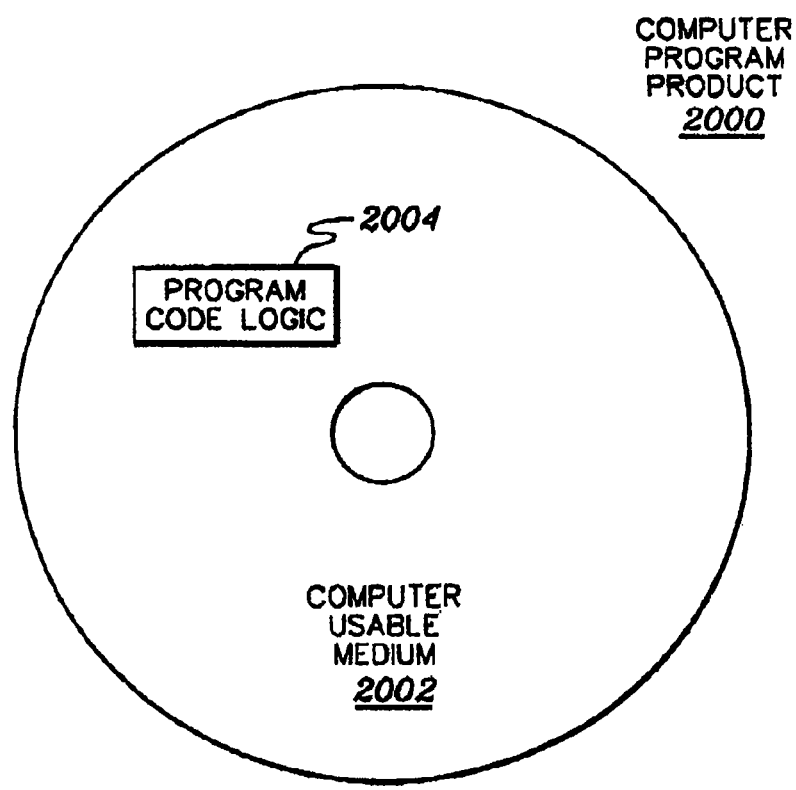
FIG. 20 depicts one embodiment of a computer program product incorporating one or more aspects of the present invention.

One example of an article of manufacture or a computer program product incorporating one or more aspects of the present invention is described with reference to FIG. 20. A computer program product 2000 includes, for instance, one or more computer usable media 2002 to store computer readable program code means or logic 2004 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for facilitating management of an IT environment by monitoring real-time data of that environment and using that data in the management. This provides up-to-date information to be used in management decisions, such as in recovery that can be performed manually, in response to the customer receiving the collected information, or automatically by a recovery process provided by the BR system.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

As used herein, the phrase "obtaining" includes having, receiving, being provided, creating, defining, or forming, as examples.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating management of an Information Technology (IT) environment, said computer-implemented method comprising:

performing, by a processor coupled to a memory, monitoring for a chosen business application of the IT environment, the business application including a set of resources and relationships associated with those resources and having a quantifiable management goal explicitly defined for the business application, the performing monitoring being programmatically initiated based on the set of resources and meeting the quantifiable management goal, said performing monitoring comprising monitoring selected real-time data located in a cache and associated with the set of resources and relationships of the business application, and wherein the performing monitoring comprises requesting information about one or more resources of the set of resources of the business application, the requesting comprising providing a group of requests to request the information, and altering a number of requests in the group of requests to meet the quantifiable management goal explicitly defined for the business application;

updating at least a portion of the cache based on the monitoring;

determining, based on an action to be taken, whether real-time data in the cache associated with the action is sufficient, in terms of being current, to be used for the action and to meet the quantifiable management goal explicitly defined for the business application;

using real-time data in the cache for the action, based on the determining indicating sufficiency for the action to be taken; and updating at least a portion of the real-time data in the cache to obtain more recent data for the action, based on the determining indicating insufficiency.

2. The computer-implemented method of claim 1, wherein the set of resources comprises at least one of a computer system, an operating system, a database, a transaction monitor, a storage facility, a network connection, an application container, an application, vendor provided hardware or vendor provided software.

3. The computer-implemented method of claim 1, further comprising forming a definition of the business application, the definition comprising a Recovery Segment.

4. The computer-implemented method of claim 1, wherein the selected real-time data comprises at least one of state data, property/value data, operation execution time duration for one or more operations on a resource or performance data.

5. The computer-implemented method of claim 4, further comprising maintaining running statistics on operation execution time duration.

6. The computer-implemented method of claim 1, wherein the monitoring comprises periodic gathering of the selected real-time data.

7. The computer-implemented method of claim 6, wherein a frequency of the periodic gathering is dynamically adjusted.

8. The computer-implemented method of claim 6, wherein the periodic gathering is commenced based on notification of a change associated with the business application.

9. The computer-implemented method of claim 6, wherein the periodic gathering is commenced based on initiation of a periodic poll.

10. The computer-implemented method of claim 1, wherein the monitoring reflects a dynamic change in topology of the business application.

11. The computer-implemented method of claim 10, wherein the dynamic change in topology comprises at least one of adding a resource to the business application, deleting a resource from the business application, adding a resource relationship to the business application or deleting a resource relationship from the business application.

12. The computer-implemented method of claim 1, wherein the action comprises one of specification of triggers in determining operational dependency ordering or assessment of state for resources when a recovery action is to be formulated.

13. A computer system for facilitating management of an Information Technology (IT) environment, said computer system comprising:

a memory; and a processor in communications with the memory, wherein the computer system is configured to perform a method, said method comprising:

performing monitoring for a chosen business application of the IT environment, the business application including a set of resources and relationships associated with those resources and having a quantifiable management goal explicitly defined for the business application, the performing monitoring being programmatically initiated based on the set of resources and meeting the quantifiable management goal, said performing monitoring comprising monitoring selected real-time data located in a cache and associated with the set of resources and relationships of the business application, and wherein the performing monitoring comprises requesting information about one or more resources of the set of resources of the business application, the requesting comprising providing a group of requests to request the information, and altering a number of requests in the group of requests to meet the quantifiable management goal explicitly defined for the business application;

updating at least a portion of the cache based on the monitoring;

determining, based on an action to be taken, whether real-time data in the cache associated with the action is sufficient, in terms of being current, to be used for the action and to meet the quantifiable management goal explicitly defined for the business application;

using real-time data in the cache for the action, based on the determining indicating sufficiency for the action to be taken; and updating at least a portion of the real-time data in the cache to obtain more recent data for the action, based on the determining indicating insufficiency.

14. The computer system of claim 13, wherein the monitoring comprises periodic gathering of the selected real-time data.

15. The computer system of claim 13, wherein the monitoring reflects a dynamic change in topology of the business application.

16. A computer program product for facilitating management of an Information Technology (IT) environment, the computer program product comprising:
   a non-transitory computer readable storage medium readable by a processor and storing instructions for execution by the processor for performing a method comprising:
      performing monitoring for a chosen business application of the IT environment, the business application including a set of resources and relationships associated with those resources and having a quantifiable management goal explicitly defined for the business application, the performing monitoring being programmatically initiated based on the set of resources and meeting the quantifiable management goal, said performing monitoring comprising monitoring selected real-time data located in a cache and associated with the set of resources and relationships of the business application, and wherein the performing monitoring comprises requesting information about one or more resources of the set of resources of the business application, the requesting comprising providing a group of requests to request the information, and altering a number of requests in the group of requests to meet the quantifiable management goal explicitly defined for the business application;
      updating at least a portion of the cache based on the monitoring;
      determining, based on an action to be taken, whether real-time data in the cache associated with the action is sufficient, in terms of being current, to be used for the action and to meet the quantifiable management goal explicitly defined for the business application;
      using real-time data in the cache for the action, based on the determining indicating sufficiency for the action to be taken; and
      updating at least a portion of the real-time data in the cache to obtain more recent data for the action, based on the determining indicating insufficiency.

17. The computer program product of claim 16, wherein the monitoring comprises periodic gathering of the selected real-time data.

18. The computer program product of claim 16, wherein the monitoring reflects a dynamic change in topology of the business application.

19. The computer program product of claim 16, wherein the action comprises one of specification of triggers in determining operational dependency ordering or assessment of state for resources when a recovery action is to be formulated.

20. A computer-implemented method of facilitating management of an Information Technology (IT) environment, said computer-implemented method comprising:
   performing, by a processor coupled to a memory, monitoring for a chosen business application of the IT environment, the business application including a set of resources and relationships associated with those resources and having a quantifiable management goal explicitly defined for the business application, and the performing monitoring being programmatically initiated based on the set of resources and meeting the quantifiable management goal, said performing monitoring comprising monitoring selected real-time data located in a cache and associated with the set of resources and relationships of the business application;
   updating at least a portion of the cache based on the monitoring;
   determining, based on an action to be taken, whether real-time data in the cache associated with the action is sufficient, in terms of being current, to be used for the action and to meet the quantifiable management goal explicitly defined for the business application, wherein the action comprises one of specification of triggers in determining operational dependency ordering or assessment of state for resources when a recovery action is to be formulated;
   using real-time data in the cache for the action, based on the determining indicating sufficiency for the action to be taken; and
   updating at least a portion of the real-time data in the cache to obtain more recent data for the action, based on the determining indicating insufficiency.

\* \* \* \* \*